United States Patent
Schleusner et al.

(10) Patent No.: US 12,473,260 B2
(45) Date of Patent: Nov. 18, 2025

(54) CHEMICAL PROCESS FOR MAKING 6-CHLORO-4-(4-FLUORO-2-METHYLPHENYL)PYRIDIN-3-AMINE A KEY INTERMEDIATE OF NT-814

(71) Applicant: KaNDy Therapeutics Limited, England (GB)

(72) Inventors: Marcel Schleusner, Groningen (NL); Massimo Ghizzoni, Groningen (NL); Ron Lawrence, Stevenage (GB)

(73) Assignee: KANDY THERAPEUTICS LIMITED, Reading (GB)

( * ) Notice: Subject to any disclaimer, the term of this patent is extended or adjusted under 35 U.S.C. 154(b) by 704 days.

(21) Appl. No.: 17/776,805

(22) PCT Filed: Nov. 9, 2020

(86) PCT No.: PCT/EP2020/081476
§ 371 (c)(1),
(2) Date: May 13, 2022

(87) PCT Pub. No.: WO2021/094247
PCT Pub. Date: May 20, 2021

(65) Prior Publication Data
US 2023/0002322 A1    Jan. 5, 2023

(30) Foreign Application Priority Data
Nov. 15, 2019 (EP) .................... 19209562

(51) Int. Cl.
| C07D 213/76 | (2006.01) |
| B01J 23/44 | (2006.01) |
| C07D 213/75 | (2006.01) |

(52) U.S. Cl.
CPC ........... *C07D 213/76* (2013.01); *B01J 23/44* (2013.01); *C07D 213/75* (2013.01)

(58) Field of Classification Search
CPC ....... C07D 213/75; C07D 213/76; B01J 23/44
See application file for complete search history.

(56) References Cited

U.S. PATENT DOCUMENTS

| 7,683,056 | B2 | 3/2010 | Alvaro et al. |
| 7,919,491 | B2 | 4/2011 | Alvaro et al. |
| 8,093,242 | B2 | 1/2012 | Anderton et al. |
| 8,097,618 | B2 | 1/2012 | Alvaro et al. |
| 8,796,269 | B2 | 8/2014 | Craig et al. |
| 10,195,205 | B2 | 2/2019 | Trower |
| 10,774,091 | B2 | 9/2020 | Trower et al. |
| 11,591,346 | B2 | 2/2023 | Trower et al. |
| 11,767,328 | B2 | 9/2023 | Trower et al. |
| 11,787,820 | B2 | 10/2023 | Trower et al. |
| 12,264,164 | B2 | 4/2025 | Trower et al. |
| 2002/0022624 | A1 | 2/2002 | Dinnell et al. |
| 2008/0269208 | A1 | 10/2008 | Alvaro et al. |
| 2015/0011510 | A1 | 1/2015 | Fadini et al. |
| 2016/0339037 | A1 | 11/2016 | Trower |
| 2019/0284205 | A1 | 9/2019 | Trower et al. |
| 2020/0361956 | A1 | 11/2020 | Trower et al. |
| 2020/0361957 | A1 | 11/2020 | Trower et al. |
| 2021/0128574 | A1 | 5/2021 | Trower |
| 2021/0236506 | A1 | 8/2021 | Trower |
| 2023/0174552 | A1 | 6/2023 | Trower et al. |
| 2023/0382922 | A1 | 11/2023 | Trower |
| 2025/0154167 | A1 | 5/2025 | Trower et al. |

FOREIGN PATENT DOCUMENTS

| EP | 1054002 A1 | | 11/2000 |
| EP | 3067349 A1 | | 9/2016 |
| EP | 3141541 A1 | | 3/2017 |
| RU | 2181120 C2 | | 4/2002 |
| RU | 2277087 C2 | | 5/2006 |
| RU | 2347777 C2 | | 2/2009 |
| RU | 2374229 C2 | | 11/2009 |
| RU | 2681316 C2 | | 3/2019 |
| WO | 0216324 A1 | | 2/2002 |
| WO | 2005002577 A1 | | 1/2005 |
| WO | 2006/013050 | * | 2/2006 |
| WO | 2006013050 A1 | | 2/2006 |
| WO | 2007/028654 | * | 3/2007 |
| WO | 2007028654 A1 | | 3/2007 |
| WO | 2010015626 A1 | | 2/2010 |
| WO | 2011023733 A1 | | 3/2011 |
| WO | 2015068744 A1 | | 5/2015 |
| WO | 2015170693 A1 | | 11/2015 |
| WO | 2016/184829 | * | 11/2016 |

(Continued)

OTHER PUBLICATIONS

U.S. Appl. No. 18/228,593, filed Jul. 31, 2023, for Trower et al. (Also cited as U.S. Publication No. 20230382922) (U.S. Patent Application is not submitted herewith pursuant to the waiver of 37 C.F.R. § 1.98(a)(2)(iii) issued by the Office on Sep. 21, 2004.).

U.S. Appl. No. 16/985,087, filed Aug. 4, 2020, for Trower et al. (Also cited as U.S. Publication No. 20200361957) (U.S. Patent Application is not submitted herewith pursuant to the waiver of 37 C.F.R. § 1.98 (a)(2)(iii) issued by the Office on Sep. 21, 2004.).

U.S. Appl. No. 17/173,069, filed Feb. 10, 2021, for Trower. (Also cited as U.S. Publication No. 20210236506) (U.S. Patent Application is not submitted herewith pursuant to the waiver of 37 C.F.R. § 1.98 (a)(2)(iii) issued by the Office on Sep. 21, 2004.).

U.S. Appl. No. 18/097,046, filed Jan. 13, 2023, for Trower et al. (A copy of U.S. Patent Application s not submitted herewith pursuant to the waiver of 37 C.F.R. § 1.98(a)(2)(iii) issued by the Office on Sep. 21, 2004.).

(Continued)

*Primary Examiner* — D Margaret M Seaman
(74) *Attorney, Agent, or Firm* — MORRISON & FOERSTER LLP

(57) ABSTRACT

The invention relates to a new process for producing compound 2-(3,5-bis(trifluoromethyl)phenyl)-N-(6-chloro-4-(4-fluoro-2-methylphenyl)pyridin-3-yl)-N,2-dimethylpropanamide (Compound IX) which is useful in the manufacture of compound 2-[3,5-Bis(trifluoromethyl)phenyl]-N-{4-(4-fluoro-2-methylphenyl)-6-[(7S,9aS)-7-(hydroxymethyl) hexahydropyrazino[2,1-c][1,4]oxazin-8(1H)-yl]-3-pyridinyl}-N,2-dimethylpropanamide (Compound A).

10 Claims, No Drawings

(56) References Cited

FOREIGN PATENT DOCUMENTS

| WO | 2016184829 A1 | 11/2016 |
|---|---|---|
| WO | 2019175253 A1 | 9/2019 |

OTHER PUBLICATIONS

International Search Report mailed Dec. 8, 2020 for PCT Application No. PCT/EP2020/081476, filed Nov. 9, 2020, 4 pages.
Kochetkov, N. K. ed. (1985). "Nitrogen-containing Heterocycles," General Organic Chemistry vol. 8, p. 752, 2 pages. English Translation.
Mashkovsky, M. D. (1993). "A Guide for Physicians:Part 1, p. 8," Drugs 12th edition, Moscow: Medistina, 3 pages. English Translaion.
Miyaura, N. et al. (1979). "Stereoselective Synthesis of Arylated (E)-Alkenes by the Reaction of Alk-1-enylboranes with Aryl Halides in the Presence of Palladium Catalyst," J. C. S. Chem. Comm. 866-867.
U.S. Appl. No. 15/157,430, filed May 18, 2016 for Mike Trower. (U.S. Patent Application is not submitted herewith pursuant to the waiver of 37 C.F.R. §1.98(a)(2)(iii) issued by the Office on Sep. 21, 2004.).
U.S. Appl. No. 16/182,572, filed Nov. 6, 2018 for Mike Trower. (U.S. Patent Application is not submitted herewith pursuant to the waiver of 37 C.F.R. §1.98(a)(2)(iii) issued by the Office on Sep. 21, 2004.).
U.S. Appl. No. 16/351,659, filed Mar. 13, 2019 for Mike Trower et al. (U.S. Patent Application is not submitted herewith pursuant to the waiver of 37 C.F.R. §1.98(a)(2)(iii) issued by the Office on Sep. 21, 2004.).
U.S. Appl. No. 16/984,961, filed Aug. 4, 2020 for Mike Trower et al. (U.S. Patent Application is not submitted herewith pursuant to the waiver of 37 C.F.R. §1.98(a)(2)(iii) issued by the Office on Sep. 21, 2004.).
U.S. Appl. No. 17/776,805, filed Nov. 9, 2020, for Schleusner et al. (U.S. Patent Application is not submitted herewith pursuant to the waiver of 37 C.F.R. § 1.98(a)(2)(iii) issued by the Office on Sep. 21, 2004.).
U.S. Appl. No. 18/967,098, filed Dec. 3, 2024, for Trower. (U.S. Patent Application is not submitted herewith pursuant to the waiver of 37 C.F.R. § 1.98 (a)(2)(iii) issued by the Office on Sep. 21, 2004.).
Zolotov, Y. A. et al. (1992). "Encyclopedia of Chemistry," Great Russian Encyclopedia, Knunyants, I. L. [ed]. vol. 3, p. 67, col. 15, 5 pages. English Translation.
U.S. Appl. No. 19/025,725, filed Jan. 16, 2025, for Tower et al. 1 (U.S. Patent Application is not submitted herewith pursuant to the waiver of 37 C.F.R. §1.98(a)(2)(iii) issued by the Office on Sep. 21, 2004.).

\* cited by examiner

CHEMICAL PROCESS FOR MAKING 6-CHLORO-4-(4-FLUORO-2-METHYLPHENYL) PYRIDIN-3-AMINE A KEY INTERMEDIATE OF NT-814

CROSS REFERENCE TO RELATED APPLICATIONS

This application is a national stage application under 35 U.S.C. § 371 of International Application No. PCT/EP2020/081476, filed internationally on Nov. 9, 2020, which claims the benefit of priority to European Application No. 19209562.8, filed Nov. 15, 2019.

FIELD OF THE INVENTION

The present invention relates to a new process for producing Compound IX which is useful in the manufacture of Compound A. The present invention also relates to Compound IX being prepared by the process and uses thereof in the manufacture of Compound A. The present invention also relates to new intermediates prepared by the process, including Compound III, Compound IV, salts of Compound V, Compound VII, and pharmaceutically acceptable salts thereof, and uses thereof in the manufacture of Compound IX or Compound A.

BACKGROUND OF THE INVENTION

Compound A or pharmaceutically acceptable salts thereof was disclosed for the first time in WO 2007/028654.

Compound A is also known in an anhydrous crystalline form. Thus, Compound A as anhydrous crystalline form (e.g. anhydrous crystalline Form 1) is described in WO2011/023733.

Compound A or pharmaceutically acceptable salts thereof, including anhydrous crystalline Form 1 thereof, are useful in, inter alia, the treatment of sex hormone diseases, including hot flushes, polycystic ovary syndrome (PCOS), endometriosis, heavy menstrual bleeding, uterine fibroids or adenomyosis. See International Patent publication. No. WO2016/184829.

Methods for preparing Compound A or pharmaceutically acceptable salts thereof, and anhydrous crystalline Form 1 thereof are disclosed in International Patent Publication Nos. WO2007/028654 and WO2011/023733 respectively. The methods produce Compound A or anhydrous crystalline Form 1 thereof by reaction of Compound XI.

Methods for preparing Compound IX are disclosed in International Patent publication. Nos. WO2005/002577, WO2006/013050, and WO2002/016324, and in European Patent Nos. EP3067349 and EP3141541. However, these methods generally suffer from low yield and high cost, or use materials which are not commercially available with a consequential impact on the overall cost of synthesizing Compound A.

Thus, there is a need for an improved process for preparing Compound IX which is useful for producing Compound A. The present invention addresses this need.

SUMMARY OF THE INVENTION

In some aspects, the present invention provides a method of preparing Compound IX, comprising one or more of the following steps:
  (i) reacting Compound I with Compound II to form Compound III;
  (ii) reacting Compound III to form Compound IV;
  (iii) reacting Compound IV to form Compound V or a pharmaceutically acceptable salt thereof;
  (iv) reacting Compound V or the pharmaceutically acceptable salt thereof with Compound VI to form Compound VII; and
  (v) reacting Compound VII with Compound VIII to form Compound IX.

In some aspects, the present invention provides use of Compound I, Compound III, Compound IV, Compound V, Compound VII, or a pharmaceutically acceptable salt thereof, in the manufacture of Compound IX.

In some aspects, the present invention provides an intermediate being selected from Compound III, Compound IV, Compound VII, or salts thereof.

In some aspect, the present invention provides salts of Compound V.

In some aspects, the present invention provides Compound IX prepared by a method disclosed herein.

In some aspects, the present invention provides a method of preparing Compound A, comprising one or more of the following steps:
  (vi) reacting Compound IX, prepared by a method disclosed herein, with Compound X to form Compound XI or a pharmaceutically acceptable salt thereof;
  (vii) reacting Compound XI or the pharmaceutically acceptable salt thereof to form a pharmaceutically acceptable salt and/or solvate of Compound A;
  (viii) reacting the pharmaceutically acceptable salt and/or solvate of Compound A to form Compound A (e.g., Form 1).

In some aspects, the present invention provides a method of preparing Compound A, comprising one or more of steps (i)-(viii).

In some aspects, the present invention provides use of Compound III, Compound IV, Compound V, Compound VII, or a pharmaceutically acceptable salt thereof, in the manufacture of Compound A.

In some aspects, the present invention provides use of Compound IX being prepared by a method disclosed herein, in the manufacture of Compound A.

In some aspects, the present invention provides Compound A prepared by a method disclosed herein.

In some aspects, the present invention provides a pharmaceutical composition comprising Compound A prepared by a method disclosed herein and one or more of pharmaceutically acceptable excipient, carrier, and/or diluent.

In some aspects, the present invention provides a method of treating or preventing a sex-hormone disease, comprising administering to a subject in need thereof Compound A prepared by a method disclosed herein or a pharmaceutical composition thereof.

In some aspects, the present invention provides Compound A prepared by a method disclosed herein, or a pharmaceutical composition thereof, for use in treating or preventing a sex-hormone disease.

In some aspects, the present invention provides use of Compound A prepared by a method disclosed herein in the manufacture of a medicament for use in treating or preventing a sex-hormone disease.

In some aspects, the present invention provides a method of treating or preventing a condition, comprising administering to a subject in need thereof Compound A prepared by a method disclosed herein or a pharmaceutical composition thereof.

In some aspects, the present invention provides Compound A prepared by a method disclosed herein, or a pharmaceutical composition thereof, for use as a medicament In some aspects, the present invention provides use of Compound A prepared by a method disclosed herein in the manufacture of a medicament for use in therapy.

Unless otherwise defined, all technical and scientific terms used herein have the same meaning as commonly understood by one of ordinary skill in the art to which this invention belongs. In the specification, the singular forms also include the plural unless the context clearly dictates otherwise. Although methods and materials similar or equivalent to those described herein can be used in the practice or testing of the present invention, suitable methods and materials are described below. All publications, patent applications, patents and other references mentioned herein are incorporated by reference. The references cited herein are not admitted to be prior art to the claimed invention. In the case of conflict, the present specification, including definitions, will control. In addition, the materials, methods and examples are illustrative only and are not intended to be limiting.

Other features and advantages of the invention will be apparent from the following detailed description and claims.

DETAILED DESCRIPTION OF THE INVENTION

The present invention is based on, inter alia, a discovery of a novel and efficient process for preparing Compound IX. The process may produce Compound IX in suitable quality for the production of Compound A (e.g., with high purity) and may be readily scalable on an industrial scale.

Definitions

As used herein, "Compound A" refers to 2-[3,5-Bis(trifluoromethyl)phenyl]-N-{4-(4-fluoro-2-methylphenyl)-6-[(7S,9aS)-7-(hydroxymethyl)hexahydropyrazino[2,1-c][1,4]oxazin-8(1H)-yl]-3-pyridinyl}-N,2-dimethylpropanamide, and has the chemical structure depicted below.

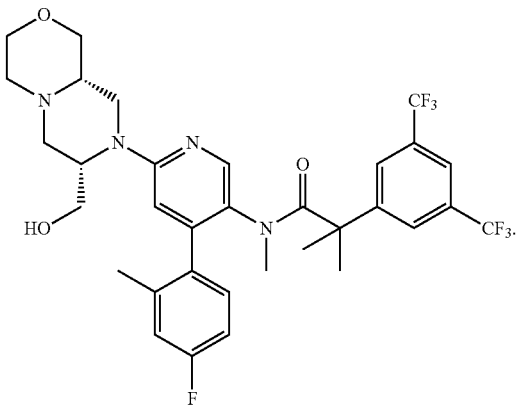
(Compound A)

As used herein, "Form 1" of Compound A refers to anhydrous crystalline form of Compound A ("Form 1") having 2 theta angles occurring at 4.3±0.1, 7.9±0.1, 9.8±0.1, 10.7±0.1, 10.8±0.1, 13.3±0.1, 14.0±0.1, 15.1±0.1 degrees, which correspond respectively to d-spacing at 20.4, 11.1, 9.0, 8.3, 8.2, 6.6, 6.3 and 5.9 Angstroms (Å).

As used herein, "Compound I" refers to 4-chloro-5-nitropyridin-2(1H)-one and has the chemical structure depicted below. It is understood that Compound I is commercially available, e.g., from Leapchem, RennoTech Co., Ltd., Chemieliva Pharmaceutical Co., Ltd., or Alchem Pharmtech, Inc.

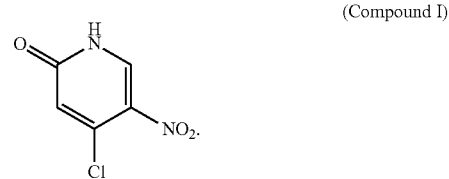 [SMILES: O=c1cc(Cl)c([N+](=O)[O-])c[nH]1]
(Compound I)

As used herein, "Compound II" refers to 4-fluoro-2-methylphenyl boronic acid and has the chemical structure depicted below:

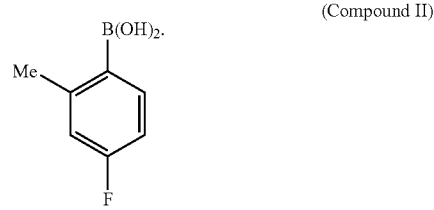 [SMILES: Cc1cc(F)ccc1B(O)O]
(Compound II)

As used herein, "Compound III" refers to 4-(4-fluoro-2-methylphenyl)-5-nitropyridin-2(1H)-one and has the chemical structure depicted below:

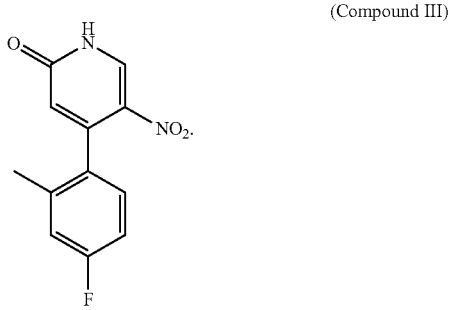 [SMILES: Cc1cc(F)ccc1-c1cc(=O)[nH]cc1[N+](=O)[O-]]
(Compound III)

As used herein, "Compound IV" refers to 2-chloro-4-(4-fluoro-2-methylphenyl)-5-nitropyridine and has the chemical structure depicted below:

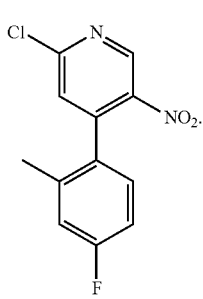

(Compound IV)

As used herein, "Compound V" refers to 6-chloro-4-(4-fluoro-2-methylphenyl)pyridin-3-amine and has the chemical structure depicted below:

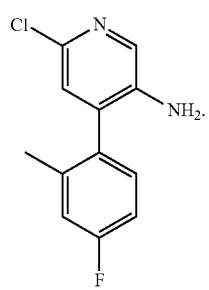

(Compound V)

As used herein, "Compound VI" refers to 2-(3,5-bis(trifluoromethyl)phenyl)-2-methylpropanoyl chloride and has the chemical structure depicted below. Compound VI and methods for its preparation are described in U.S. Appl. Pub. No. 2015/0011510, and in Journal of Organic Chemistry, 71(5), 2000-2008 (2006).

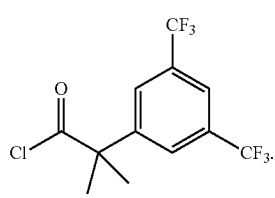

(Compound VI)

As used herein, "Compound VII" refers to 2-(3,5-bis(trifluoromethyl)phenyl)-N-(6-chloro-4-(4-fluoro-2-methylphenyl)pyridin-3-yl)-2-methyl-propanamide and has the chemical structure depicted below:

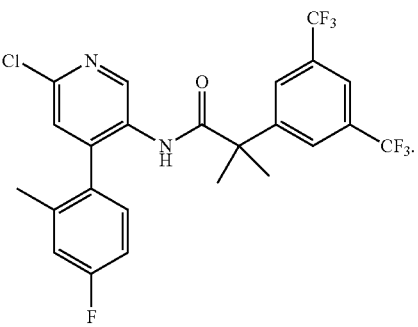

(Compound VII)

As used herein, "Compound VIII" refers to methyl halide and has the chemical structure of $CH_3X$, wherein X is a halogen. In some embodiments, X is Cl, I, Br, or I. In some embodiments, X is Cl, Br, or I. In some embodiments, Compound VIII is $CH_3Cl$, $CH_3Br$, or $CH_3I$. In some embodiments, Compound VIII is $CH_3Cl$, $CH_3Br$, or $CH_3I$.

As used herein, "Compound IX" refers to 2-(3,5-bis(trifluoromethyl)phenyl)-N-(6-chloro-4-(4-fluoro-2-methylphenyl)pyridin-3-yl)-N,2-dimethylpropanamide and has the chemical structure depicted below:

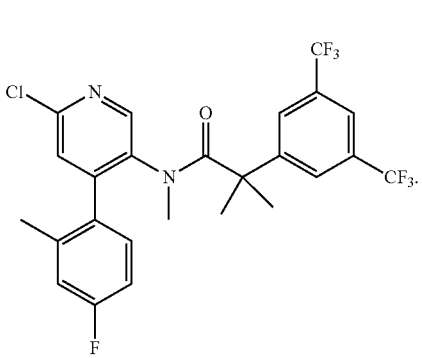

(Compound IX)

As used herein, "Compound X" refers to (7S,9aS)-7-((benzyloxy)methyl)octahydropyrazino[2,1-c][1,4]oxazine], a compound having the chemical structure depicted below:

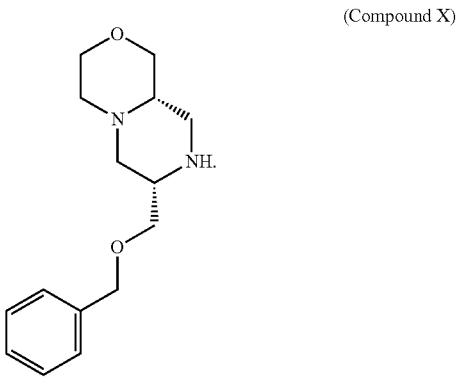 [SMILES: c1ccc(COC[C@@H]2CN3CCOC[C@@H]3CN2)cc1]

(Compound X)

As used herein, "Compound XI" refers to N-(6-((7S,9aS)-7-((benzyloxy)methyl)hexahydropyrazino[2,1-c][1,4]

oxazin-8(1H)-yl)-4-(4-fluoro-2-methylphenyl)pyridin-3-yl)-2-(3,5-bis(trifluoromethyl)phenyl)N,2-dimethylpropanamide, a compound having the chemical structure depicted below:

(Compound XI)

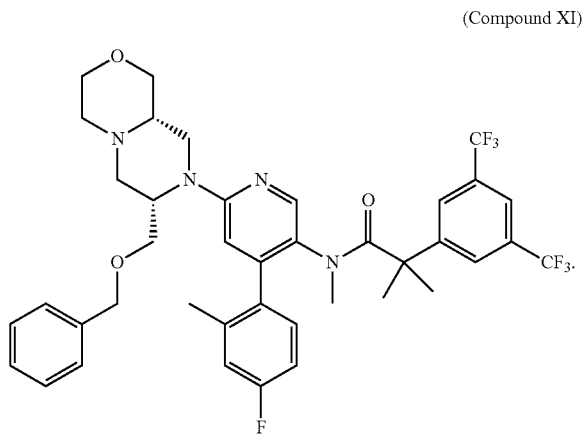 [SMILES: Cc1cc(F)ccc1-c1cc(N2C[C@H]3COCCN3C[C@H]2COCc2ccccc2)ncc1N(C)C(=O)C(C)(C)c1cc(C(F)(F)F)cc(C(F)(F)F)c1]

It is to be understood the present disclosure includes the compounds of the present invention and any pharmaceutically acceptable salts and solvates thereof, and includes stereoisomers, mixtures of stereoisomers, polymorphs of all isomeric forms of said compounds.

As used herein, the term "salt" or "pharmaceutically acceptable salts" refers to any salt of a compound according to the present invention prepared from an inorganic or organic acid Suitable salts or pharmaceutically acceptable salts of the compounds of the present invention include acid addition salts formed with inorganic acids such as hydrochloric, hydrobromic, hydroiodic, phosphoric, metaphosphoric, nitric and sulfuric acids, and with organic acids, such as tartaric, acetic, trifluoroacetic, citric, malic, lactic, fumaric, benzoic, formic, propionic, glycolic, gluconic, maleic, succinic, camphorsulfuric, isothionic, mucic, gentisic, isonicotinic, saccharic, glucuronic, furoic, glutamic, ascorbic, anthranilic, salicylic, phenylacetic, mandelic, embonic (pamoic), methanesulfonic, ethanesulfonic, pantothenic, stearic, sulfinilic, alginic, galacturonic and arylsulfonic, for example benzenesulfonic and p-toluenesulfonic, acids.

As used herein, the term "solvate" refers to solvent addition forms that contain either stoichiometric or non-stoichiometric amounts of solvent. Some compounds have a tendency to trap a fixed molar ratio of solvent molecules in the crystalline solid state, thus forming a solvate. If the solvent is water, the solvate formed is a hydrate; and if the solvent is alcohol, the solvate formed is an alcoholate. Hydrates are formed by the combination of one or more molecules of water with one molecule of the substance in which the water retains its molecular state as $H_2O$.

As used herein, the term "Compound A" is intended to include unless otherwise indicated herein any form of the Compound A, such as the free base and pharmaceutically acceptable salts. The free base and pharmaceutically acceptable salts include anhydrous forms and solvated forms such as hydrates. The anhydrous forms and the solvates include amorphous and crystalline forms.

As used herein, the term "salt" of Compound V is intended to include salts, solvates and hydrates of Compound V.

As used herein, "treatment" or "treating" is intended to indicate the management and care of a patient for the purpose of alleviating, arresting, partly arresting or delaying progress of the clinical manifestation of the disease, or curing the disease. The patient to be treated is preferably a mammal, in particular a human being.

As used herein, the term "preventing," or "prevent," describes reducing or eliminating the onset of the symptoms or complications of such disease, condition or disorder.

As used herein, the term "hot flushes" is interchangeable with the term "hot flashes" and with the term "vasomotor symptoms" and is intended to have the same meaning.

As used herein the term "comprising" includes the case of "consisting only of."

The description herein of any aspect or aspect of the invention using terms such as "comprising", "having," "including" or "containing" with reference to an element or elements is intended to provide support for a similar aspect or aspect of the invention that "consists of", "consists essentially of" or "substantially comprises" that particular element or elements, unless otherwise stated or clearly contradicted by context (e.g., a composition described herein as comprising a particular element should be understood as also describing a composition consisting of that element, unless otherwise stated or clearly contradicted by context).

As used herein the term "room temperature" refers to a range of temperatures from about 15° C. to about 25° C.

The use of the terms "a" and "an" and "the" and similar referents in the context of describing the invention are to be construed to cover both the singular and the plural, unless otherwise indicated herein or clearly contradicted by context. For example, the phrase "the compound" is to be understood as referring to various "compounds" of the invention or particular described aspect, unless otherwise indicated.

In the present context the term "purity" indicates the percentage by area of the product determined by a chromatographic method, such as HPLC-MS or by quantitative 1H NMR (measured against an internal reference standard).

In the present context the term "conversion" indicates the extent of the transformation of a substrate in a given reaction.

As used herein, the term "pharmaceutical composition" is a formulation containing the compounds of the present invention in a form suitable for administration to a subject. In some embodiments, the pharmaceutical composition is in bulk or in unit dosage form. The unit dosage form is any of a variety of forms, including, for example, a capsule, an IV bag, a tablet, a single pump on an aerosol inhaler or a vial. The quantity of active ingredient (e.g., a formulation of the disclosed compound or salt, hydrate, solvate or isomer thereof) in a unit dose of composition is an effective amount and is varied according to the particular treatment involved. One skilled in the art will appreciate that it is sometimes necessary to make routine variations to the dosage depending on the age and condition of the patient. The dosage will also depend on the route of administration. A variety of routes are contemplated, including oral, pulmonary, rectal, parenteral, transdermal, subcutaneous, intravenous, intramuscular, intraperitoneal, inhalational, buccal, sublingual, intrapleural, intrathecal, intranasal, and the like. Dosage forms for the topical or transdermal administration of a compound of this invention include powders, sprays, ointments, pastes, creams, lotions, gels, solutions, patches and inhalants. In one embodiment, the active compound is mixed under sterile conditions with a pharmaceutically acceptable carrier, and with any preservatives, buffers, or propellants that are required.

As used herein, the term "pharmaceutically acceptable" refers to those compounds, anions, cations, materials, compositions, carriers, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

As used herein, the term "pharmaceutically acceptable excipient" means an excipient that is useful in preparing a pharmaceutical composition that is generally safe, non-toxic and neither biologically nor otherwise undesirable, and includes excipient that is acceptable for veterinary use as well as human pharmaceutical use. A "pharmaceutically acceptable excipient" as used in the specification and claims includes both one and more than one such excipient.

As used herein, the term "subject" is interchangeable with the term "subject in need thereof", both of which refer to a subject having a disease or having an increased risk of developing the disease. A "subject" includes a mammal. The mammal can be e.g., a human or appropriate non-human mammal, such as primate, mouse, rat, dog, cat, cow, horse, goat, camel, sheep or a pig. The subject can also be a bird or fowl. In one embodiment, the mammal is a human. A subject in need thereof can be one who has been previously diagnosed or identified as having an imprinting disorder. A subject in need thereof can also be one who has (e.g., is suffering from) an imprinting disorder. Alternatively, a subject in need thereof can be one who has an increased risk of developing such disorder relative to the population at large (i.e., a subject who is predisposed to developing such disorder relative to the population at large). A subject in need thereof can have a refractory or resistant imprinting disorder (i.e., an imprinting disorder that doesn't respond or hasn't yet responded to treatment). The subject may be resistant at start of treatment or may become resistant during treatment.

As used herein, the expressions "one or more of A, B, or C," "one or more A, B, or C," "one or more of A, B, and C," "one or more A, B, and C," "selected from the group consisting of A, B, and C", "selected from A, B, and C", and the like are used interchangeably and all refer to a selection from a group consisting of A, B, and/or C, i.e., one or more As, one or more Bs, one or more Cs, or any combination thereof, unless indicated otherwise.

All publications and patent documents cited herein are incorporated herein by reference as if each such publication or document was specifically and individually indicated to be incorporated herein by reference. Citation of publications and patent documents is not intended as an admission that any is pertinent prior art, nor does it constitute any admission as to the contents or date of the same. The invention having now been described by way of written description, those of skill in the art will recognize that the invention can be practiced in a variety of embodiments and that the foregoing description and examples below are for purposes of illustration and not limitation of the claims that follow.

Methods of Preparing Compound IX

The inventors of the present invention have found a new and efficient process to prepare Compound IX:

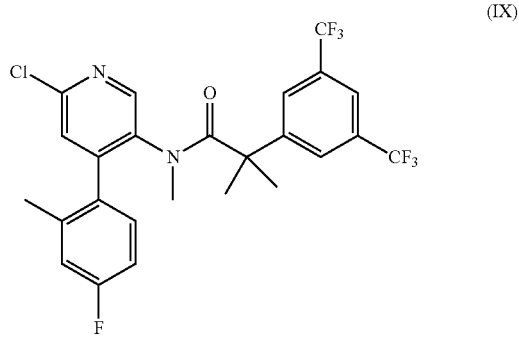 [SMILES: Cc1cc(F)ccc1-c1cc(Cl)ncc1N(C)C(=O)C(C)(C)c1cc(C(F)(F)F)cc(C(F)(F)F)c1]

comprising one or more of the following steps:

(i) reacting Compound I:

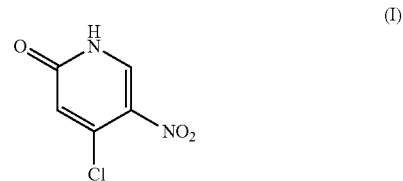 [SMILES: O=c1cc(Cl)c([N+](=O)[O-])c[nH]1]

with Compound II:

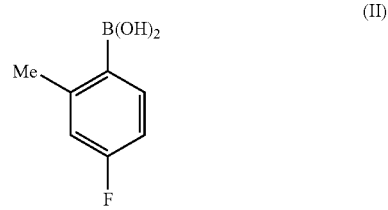 [SMILES: Cc1cc(F)ccc1B(O)O]

in the presence of a palladium catalyst and a base to form Compound III:

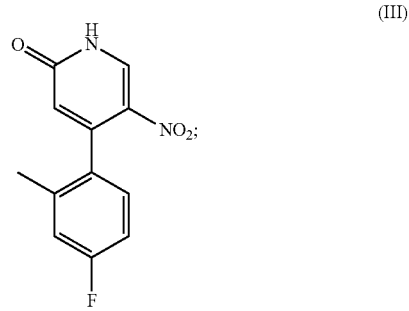 [SMILES: Cc1cc(F)ccc1-c1cc(=O)[nH]cc1[N+](=O)[O-]]

(ii) reacting Compound III with a chlorinating agent to form Compound IV:

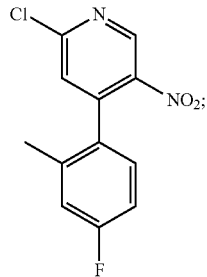

(iii) reduction of Compound IV by catalytic hydrogenation to form Compound V or a salt thereof

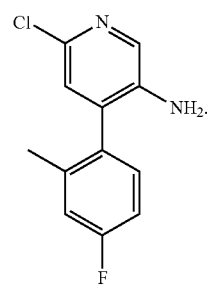

(iv) reacting Compound V or a salt thereof with 2-(3,5-bis(trifluoromethyl)phenyl)-2-methylpropanoyl chloride (Compound VI) to form Compound VII:

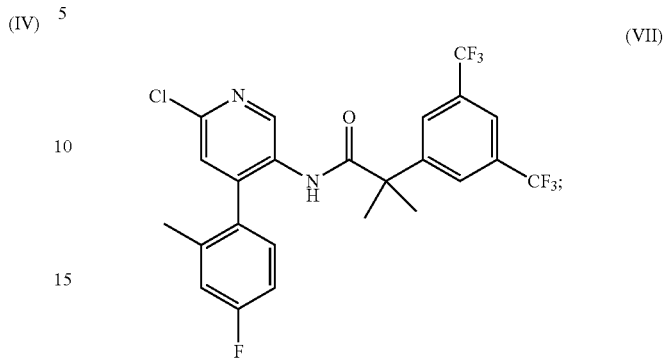

and (v) reacting Compound VII with a methylating agent (e.g., Compound VIII (e.g., $CH_3Cl$, $CH_3Br$, or $CH_3I$)) to form Compound IX.

In some embodiments, the method comprises step (i).
In some embodiments, the method comprises step (ii).
In some embodiments, the method comprises step (iii).
In some embodiments, the method comprises step (iv).
In some embodiments, the method comprises step (v).
In some embodiments, the method comprises two or more of steps (i)-(v).
In some embodiments, the method comprises three or more of steps (i)-(v).
In some embodiments, the method comprises four or more of steps (i)-(v).
In some embodiments, the method comprises steps (i)-(v).
In some embodiments, the method comprises one or more steps shown in Scheme A.

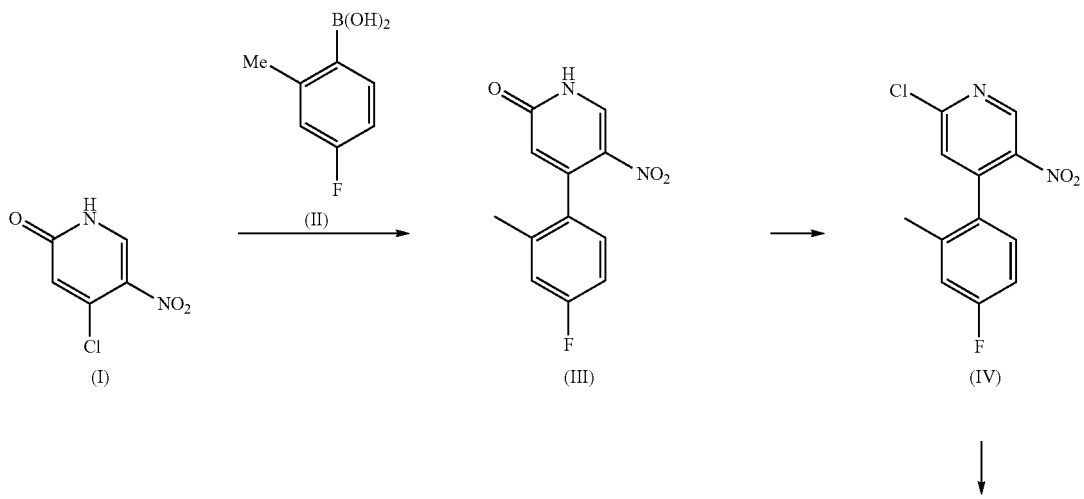

Scheme A

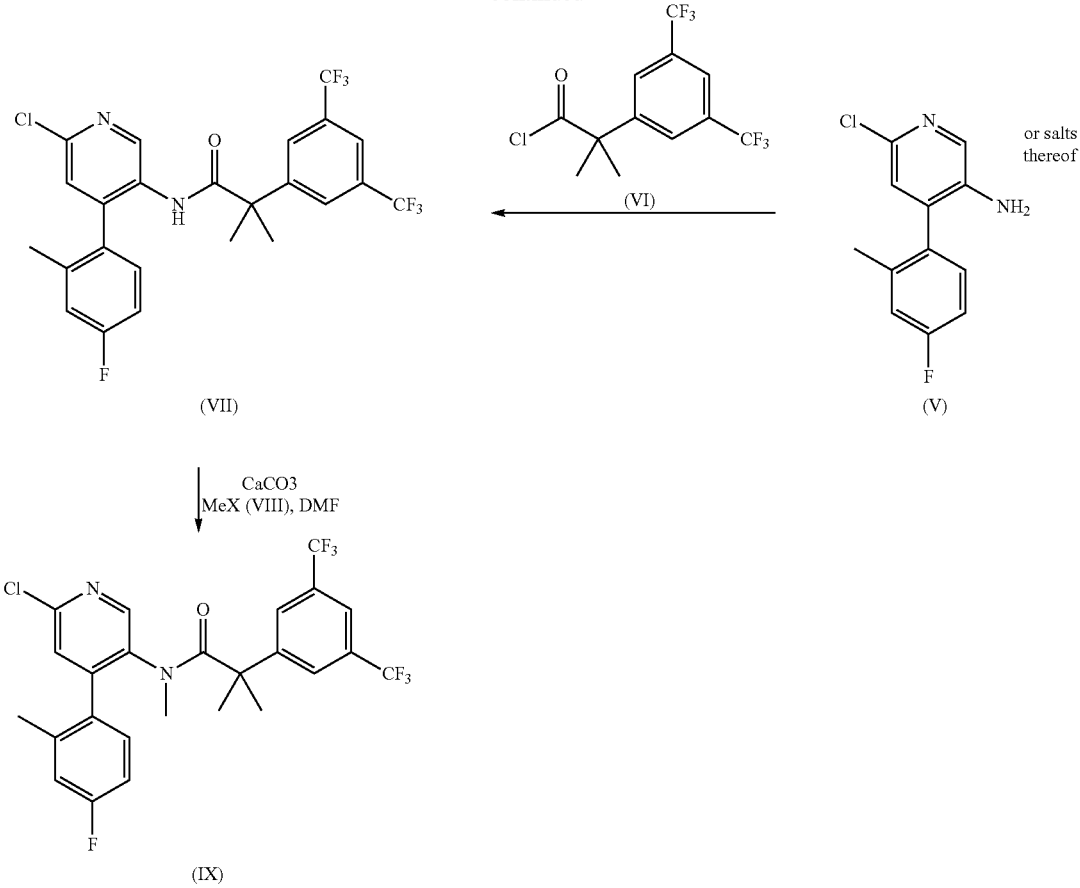

wherein X is halogen selected from chlorine, bromine or iodine.

In some embodiments, Compound IX is formed with a comparable or higher yield as compared to known methods (e.g., methods described in WO2005/002577 and U.S. 2002/0022624), and with a high degree of purity.

It is understood that the method disclosed herein provides, among other advantages, the Suzuki aryl coupling on commercially available Compound I, wherein the activated group for the aryl coupling (e.g., Cl) is already present in Compound I, thereby alleviating the need of iodination reaction in previously disclosed methods.

Step (i)

Suitable palladium catalysts for Suzuki coupling include palladium acetate, tetrakis(triphenylphosphine) palladium, bis(triphenylphosphine)palladium dichloride, or [1,1'-bis(diphenylphosphino)ferrocene]palladium dichloride.

In some embodiments, the palladium catalyst is a palladium(0) complex, e.g., tetrakis(triphenylphosphine) palladium.

In some embodiments, in step (i), the molar ratio between the palladium catalyst (e.g., the palladium (0) complex) and Compound I ranges from about 0.05 to about 0.20 (e.g., from about 0.05 to about 0.10).

Suitable bases in step (i), include potassium carbonate, cesium carbonate, triethylamine, potassium phosphate, sodium t-butoxide, or potassium t-butoxide.

In some embodiments, in step (i), the base is potassium carbonate.

In some embodiments, step (i) is performed in the presence of a solvent (e.g., an organic solvent).

Suitable solvents include a cyclic ether (e.g., tetrahydrofuran, 2-methyl tetrahydrofuran, or 1,4-dioxane), toluene, dimethylformamide, NMP, acetonitrile, or any mixture thereof.

In some embodiments, in step (i), the solvent is in 1,4-dioxane.

In some embodiments, step (i) is performed at a temperature ranging from about 20° C. to about 100° C.

In some embodiments, step (i) is performed in the presence of a palladium catalyst (e.g., tetrakis(triphenylphosphine) palladium), a base (e.g., potassium carbonate), and a solvent (e.g., 1,4-dioxane), and at a temperature ranging from about 88° C. to about 100° C.

Step (ii)

In some embodiments, the chlorinating agent is $POCl_3$.

In some embodiments, step (ii) is performed in the presence of a solvent (e.g., an organic solvent).

In some embodiments, in step (ii), the solvent is an aprotic solvent.

In some embodiments, in step (ii), the solvent is an ether (e.g., tetrahydrofuran), a halohydrocarbon (e.g., dichloromethane), N,N-dimethylformamide, or dimethoxyethane, or any mixture thereof.

In some embodiments, in step (ii), the solvent is N,N-dimethylformamide, dimethoxyethane, or a mixture thereof.

In some embodiments, step (ii) is performed at a temperature ranging from about 20° C. to about 75° C.

Step (iii)

Suitable hydrogenation catalysts include palladium or platinum on carbon.

In some embodiments, in step (iii), the hydrogenation catalyst is preferably platinum on carbon.

In some embodiments, in step (iii), the weight ratio between the hydrogenation catalyst and Compound IV ranges from about 0.05 to about 0.5 (e.g., from about 0.2 to about 0.3).

In some embodiments, step (iii) is performed in the presence of a solvent.

In some embodiments, in step (iii), the solvent is an alcohol, an ether, an ester, a hydrocarbon, or any mixture thereof.

In some embodiments, in step (iii), the solvent is an ester (e.g., ethyl acetate).

In some embodiments, step (iii) is performed at about room temperature.

In some embodiments, in step (iii), Compound V is isolated.

The inventors have found a very convenient method to isolate Compound (V) in good purity and yield by reaction of (V) with an acid to form a salt of Compound (V) directly from the reaction mixture.

Suitable salts of Compound V include a maleic salt, a hydrochloric salt, a hydrobromic salt, a phosphoric salt, an acetic salt, a fumaric salt, a salicylic salt, a sulphate salt, a citric salt, a lactic salt, a mandelic salt, a tartaric salt, or a methanesulphonic salt.

In some embodiments, in step (iii), a hydrochloride salt of Compound V is isolated.

In some embodiments, in step (iii), the hydrochloride salt of Compound V is isolated with a purity of at least about 97.5% and in a yield of at least of about 72%.

Suitable acids include halogenhydric acid, maleic acid, phosphoric acid, acetic acid, fumaric acid, salicylic acid, sulphate acid, citric acid, lactic acid, mandelic acid, tartaric acid, or methanesulphonic acid.

In some embodiments, in step (iii), the acid is halogenhydric acid (e.g., hydrogen chloride, hydrogen bromide, or hydrogen iodide).

In some embodiments, in step (iii), the acid is hydrogen chloride.

In some embodiments, in step (iii), the hydrogen chloride is added as a hydrogen chloride gas.

In some embodiments, in step (iii), the hydrogen chloride is dissolved in an organic solvent (e.g., an alcohol (e.g., methanol, ethanol, propanol, isopropanol or butanol), or an ether (e.g., 1,4-dioxane)), or the hydrogen chloride dissolved in an aqueous solution.

In some embodiments, in step (iii), the hydrochloride salt of Compound V is obtained by adding to the reaction mixture an aqueous solution of hydrogen chloride, followed by adding an aprotic solvent (e.g., acetonitrile).

In some embodiments, in step (iii), the hydrochloride salt of Compound V is obtained by adding to the reaction mixture hydrogen chloride in 1,4-dioxane.

Step (iv)

In some embodiments, step (iv) is performed in the presence of an organic base (e.g., pyridine, triethylamine, diisopropylamine, N,N-diisopropylethylamine, or 2,6-lutidine).

In some embodiments, step (iv) is performed in the presence of a solvent (e.g., dichloromethane).

In some embodiments, step (iv) is performed at a temperature ranging from about 0° C. to about 5° C.

In some embodiments, in step (iv), Compound VI is added to the mixture of Compound V or the pharmaceutically acceptable salt thereof and the organic base in the solvent.

In some embodiments, in step (iv), Compound V, Compound VI, and the organic are mixed simultaneously in the solvent.

In some embodiments, in step (iv), Compound VII is formed with a high degree of purity and is used in the following step without any further purification.

In some embodiments, in step (iv), Compound VI is added to a mixture of the pharmaceutically acceptable salt of Compound V (e.g., the hydrochloride salt of Compound V) and the organic base (e.g., pyridine) in the solvent (e.g., dichloromethane).

Step (v)

In some embodiments, Compound VIII is $CH_3Cl$, $CH_3Br$, or $CH_3I$.

In some embodiments, in step (v), the methylating agent is dimethylsulphate.

In some embodiments, step (v) is performed in the presence of a base.

In some embodiments, in step (v), the base is an organic base (e.g., pyridine, triethylamine, diisopropylamine, N,N-diisopropylethylamine, or 2,6-lutidine).

In some embodiments, in step (v), the base is an inorganic base (e.g., potassium carbonate, cesium carbonate, potassium phosphate, sodium t-butoxide, or potassium t-butoxide).

In some embodiments, in step (v), the base is cesium carbonate.

In some embodiments, step (v) is performed in the presence of a solvent (e.g., DMF, acetonitrile, or an ether).

Methods of Preparing Compound A

In some aspects, the present invention provides a method of preparing Compound A, comprising one or more of the following steps:

(vi) reacting Compound IX, prepared by a method disclosed herein, with Compound X or pharmaceutically acceptable salts thereof to form Compound XI or a pharmaceutically acceptable salt thereof;

(vii) reacting Compound XI or the pharmaceutically acceptable salt thereof to form a pharmaceutically acceptable salt and/or solvate of Compound A;

(viii) reacting the pharmaceutically acceptable salt and/or solvate of Compound A to form Compound A (e.g., Form 1).

In some embodiments, the method comprises step (vi).
In some embodiments, the method comprises step (vii).
In some embodiments, the method comprises step (viii).
In some embodiments, the method comprises two or more of steps (vi)-(viii).
In some embodiments, the method comprises steps (vi)-(viii).

In some aspects, the present invention provides a method of preparing Compound A, comprising one or more of steps (i)-(viii).

In some embodiments, the method comprises step (i).
In some embodiments, the method comprises step (ii).
In some embodiments, the method comprises step (iii).
In some embodiments, the method comprises step (iv).
In some embodiments, the method comprises step (v).
In some embodiments, the method comprises step (vi).
In some embodiments, the method comprises step (vii).
In some embodiments, the method comprises step (viii).
In some embodiments, the method comprises two or more of steps (i)-(viii).

17

In some embodiments, the method comprises three or more of steps (i)-(viii).

In some embodiments, the method comprises four or more of steps (i)-(viii).

In some embodiments, the method comprises five or more of steps (i)-(viii).

In some embodiments, the method comprises six or more of steps (i)-(viii).

In some embodiments, the method comprises seven or more of steps (i)-(viii).

In some embodiments, the method comprises steps (i)-(viii).

18

In some aspects, the present invention provides use of Compound III, Compound IV, Compound V, Compound VII, or a pharmaceutically acceptable salt thereof, in the manufacture of Compound A.

In some aspects, the present invention provides use of Compound IX prepared by a method disclosed herein in the manufacture of Compound A.

In some aspects, the present invention provides Compound A prepared by a method disclosed herein.

In some embodiments, the method comprises one or more steps shown in Scheme B.

In some embodiments, the method comprises one or more steps shown in Scheme A or Scheme B.

Scheme B

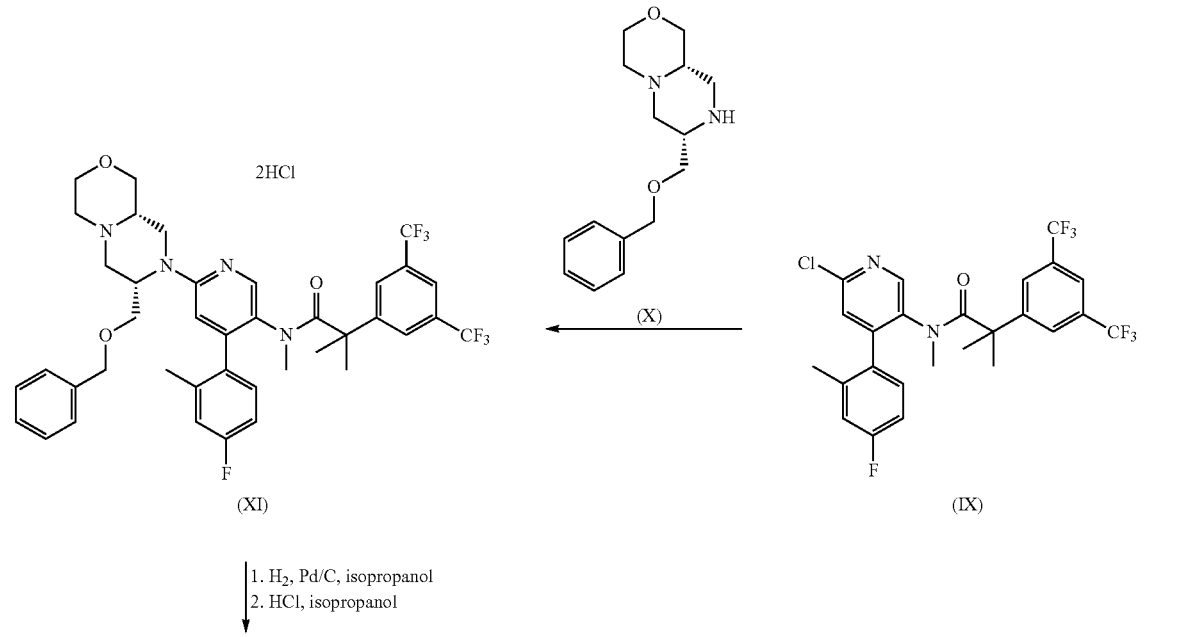

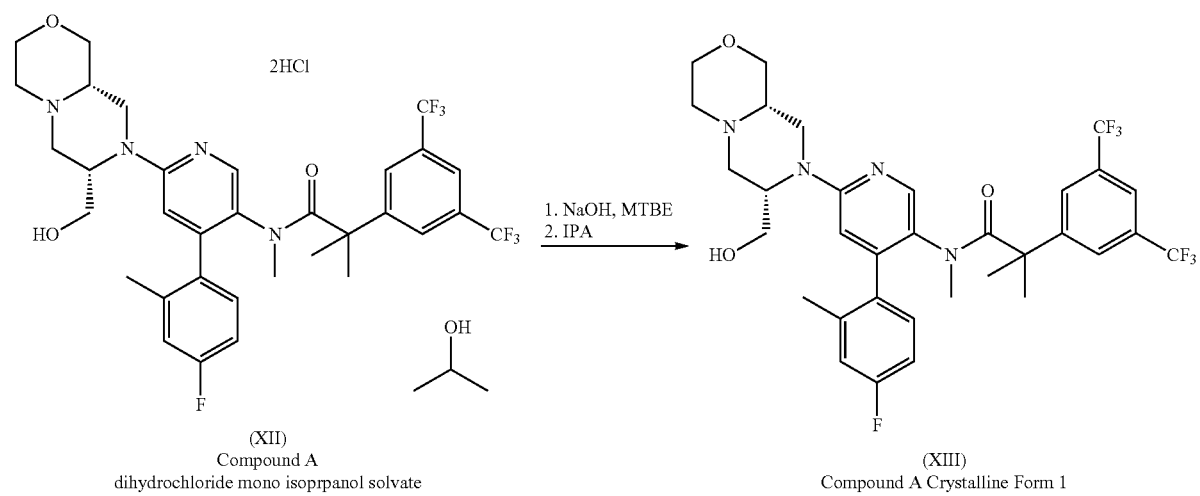

Prepared Intermediates and Compounds.

In some aspects, the present invention provides an intermediate being selected from Compound I, Compound III, Compound IV, Compound VII, or salts thereof, and a salt of Compound V.

In some embodiments, the intermediate is prepared by a method described herein.

In some embodiments, the intermediate is Compound III or a salt thereof.

In some embodiments, the intermediate is Compound III.

In some embodiments, the intermediate is Compound IV or a salt thereof.

In some embodiments, the intermediate is Compound IV.

In some embodiments, the intermediate is a salt of Compound V, preferably a salt selected from the group consisting of maleate, malate, hydrochloride, hydrobromide, phosphate, acetate, fumarate, salicylate, sulphate, hydrogen sulfate, citrate, lactate, mandelate, tartrate, tosylate, besylate and methanesulphonate, In some embodiment the salt of Compound V is the hydrochloride.

In some embodiments, the intermediate is Compound VII or a pharmaceutically acceptable salt thereof.

In some embodiments, the intermediate is Compound VII.

In some aspects, the present invention provides Compound IX prepared by a method disclosed herein.

In some aspects, the present invention provides Compound A prepared by a method disclosed herein.

Pharmaceutical Compositions

In some aspects, the present invention provides a pharmaceutical composition comprising Compound A prepared by a method disclosed herein and one or more of pharmaceutically acceptable excipient, carrier, and/or diluent.

Pharmaceutical compositions comprising Compound A are disclosed in WO2016/184829, WO2011/023733, and WO2007/028654, and International Patent publication WO2019/175253.

It is to be understood that the pharmaceutical compositions can be included in a container, pack, or dispenser together with instructions for administration.

Uses of Prepared Compound A

In some aspects, the present invention provides a method of treating or preventing a sex-hormone disease, comprising administering to a subject in need thereof Compound A prepared by a method disclosed herein or a pharmaceutical composition thereof.

In some aspects, the present invention provides Compound A prepared by a method disclosed herein, or a pharmaceutical composition thereof, for use in treating or preventing a sex-hormone disease in a subject in need thereof.

In some aspects, the present invention provides use of Compound A prepared by a method disclosed herein in the manufacture of a medicament for use in treating or preventing a sex-hormone disease in a subject in need thereof.

In some embodiments, the sex-hormone disease is benign prostatic hyperplasia (BPH), metastatic prostatic carcinoma, testicular cancer, breast cancer, androgen dependent acne, seborrhoea, hypertrichosis, male pattern baldness, or in boys precocious puberty.

In some embodiments, the subject in need thereof is a male.

In some embodiments, the subject in need thereof is a female.

In some embodiments, the sex-hormone disease is endometriosis, abnormal puberty, uterine fibroids, uterine fibroid tumor, heavy menstrual bleeding, dysfunctional uterine bleeding, hormone-dependent cancers e.g., (breast, endometrial, ovarian, or uterine), hot flushes, hyperandrogenism, hirsutism, hypertrichosis, female androgenetic alopecia, androgen dependent acne, seborrhoea, virilization, polycystic ovary syndrome (PCOS), premenstrual dysphoric disease (PMDD), HAIR-AN syndrome (hyperandrogenism, insulin resistance and acanthosis nigricans), ovarian hyperthecosis (HAIR-AN with hyperplasia of luteinized theca cells in ovarian stroma), other manifestations of high intraovarian androgen concentrations (e.g. follicular maturation arrest, atresia, anovulation, dysmenorrhea, dysfunctional uterine bleeding, infertility) and androgen-producing tumor (virilizing ovarian or adrenal tumor), or osteoporosis.

In some embodiments, the sex-hormone disease is hidradenitis suppurativa or hot flushes. In some aspects, the present invention provides a method of treating or preventing a condition, comprising administering to a subject in need thereof Compound A prepared by a method disclosed herein or a pharmaceutical composition thereof.

In some aspects, the present invention provides Compound A prepared by a method disclosed herein, or a pharmaceutical composition thereof, for use in treating or preventing a condition in a subject in need thereof.

In some aspects, the present invention provides use of Compound A prepared by a method disclosed herein in the manufacture of a medicament for use in treating or preventing a sex-condition in a subject in need thereof.

In some embodiments, the condition is a symptom of the perimenopause, the menopause, or the post menopause selected from a pathological gain of excess body fat and/or excess body weight, diabetes, fatigue, irritability, cognitive decline, hair-loss, dry skin, insomnia, sleep disturbances and nighttime awakenings, anxiety and depression, decreases in sexual desire, vaginal dryness and pain, connective tissue loss and muscle bulk reduction, bone loss, urinary symptoms of urgency and dysuria, hot flushes, and night sweats.

In some embodiments, a symptom of the menopause in women may be caused by certain types of chemotherapy, e.g., aromatase inhibitors such as anastrozole, exemestane, letrozole and testolactone; gonadotropin-releasing hormone receptor agonists such as such as leuprolide, buserelin, histrelin, goserelin, deslorelin, nafarelin and triptorelin; gonadotropin-releasing hormone receptor antagonists such as ASP1701, elagolix, relugolix and linzagolix (OBE2109); selective estrogen receptor modulators (SERMs) such as bazedoxifene, clomifene, cyclofenil, tamoxifen, ormeloxifene, toremifene, raloxifene, lasofoxifene and ospemifene; selective estrogen receptor degraders (SERDs) such as fulvestrant, brilanestrant and elacestrant; CYP17A1 inhibitors such as abiraterone, ketoconazole and seviteronel; and combined androgen receptor blockers and CYP17A1 inhibitors such as galeterone.

In some embodiments a symptom associated with the andropause selected from a pathological gain of excess body fat and/or excess body weight, diabetes, fatigue, irritability, cognitive decline, hairloss, dry skin, insomnia, sleep disturbances, night-time awakenings, anxiety and depression, decreases in sexual desire, connective tissue loss and muscle bulk reduction urinary symptoms of urgency and dysuria, hot flushes and night sweats.

In some embodiments, a symptom of the andropause may be caused by certain androgen deprivation therapies e.g. gonadotropin-releasing hormone receptor agonists such as such as leuprolide, buserelin, histrelin, goserelin, deslorelin, nafarelin and triptorelin; gonadotropin-releasing hormone receptor antagonists such as ASP1701, elagolix, relugolix and linzagolix (OBE2109); antiandrogens (androgen receptor blockers) such as cyproterone acetate, apalutamide, bicalutamide, darolutamide, enzalutamide, flutamide, nilutamide; CYP17A1 inhibitors such as abiraterone, ketoconazole and seviteronel; and combined androgen receptor blockers and CYP17A1 inhibitors such as galeterone.

In some embodiments, the disease is a "leptin-related disease" selected from metabolic disorders such as diabetes, cardiovascular disease, obesity, excessive eating, hypertension, metabolic syndrome and inflammatory disorders.

In some embodiments, the disease is a 'weight-related disease' selected from a genetic susceptibility to excess body weight, obesity associated with metabolic disorders, or a condition for which a decreased body weight would be of therapeutic benefit.

In some embodiments, the disease is a "disorder of pregnancy" selected from eclampsia, pre-eclampsia, gestational diabetes mellitus, high blood pressure, morning sickness, hyperemesis gravidarum, miscarriage, pelvic girdle pain, and premature birth.

All references, including publications, patent applications, and patents, cited herein are hereby incorporated by reference in their entirety and to the same extent as if each reference were individually and specifically indicated to be incorporated by reference and were set forth in its entirety herein (to the maximum extent permitted by law), regardless of any separately provided incorporation of particular documents made elsewhere herein.

It should be understood that the various aspects, embodiments, implementations and features of the disclosure mentioned herein may be claimed separately, or in any combination.

Embodiments According to the Invention

In the following, embodiments of the invention are disclosed. The first embodiment is denoted E1, the second embodiment is denoted E2 and so forth.

E1 A process for preparing Compound IX:

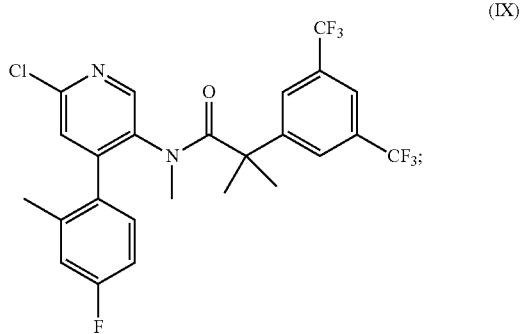 [SMILES: Cc1cc(F)ccc1-c1cc(Cl)ncc1N(C)C(=O)C(C)(C)c1cc(C(F)(F)F)cc(C(F)(F)F)c1]

(IX)

said process comprising the following step i) reaction of 4-chloro-5-nitropyridin-2(1H)-one (Compound I) with 4-fluoro-2-methylphenyl boronic acid (Compound II) catalyzed by a palladium complex in the presence of a base to obtain 4-(4-fluoro-2-methylphenyl)-5-nitropyridin-2(1H)-one of structure (III):

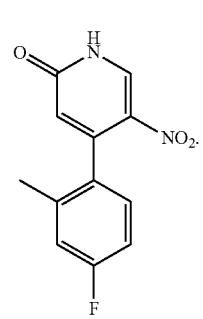

(III)

E2 The process according to embodiment 1, wherein said palladium complex is selected from palladium acetate, tetrakis(triphenylphosphine) palladum, bis(triphenylphosphine)palladium(II) dichloride, and [1,1'-bis(diphenylphosphino)ferrocene]palladium(II) dichloride, phosphine palladium complex preferably tetrakis(triphenylphosphine) palladium.

E3 The process according to any one of embodiments 1-2, wherein the ratio between said palladium complex and Compound I ranges from about 0.05 to 0.10.

E4 The process according to any one of embodiments 1-3, wherein said base is selected from potassium carbonate, cesium carbonate, triethylamine, potassium phosphate, sodium t-butoxide, potassium t-butoxide or a mixture thereof, preferably potassium carbonate.

E5 The process according to any one of embodiments 1-4, wherein step i) takes place at a temperature in the range of 20° to 100° C., preferably in the range of 88-100° C.

E6 The process according to any one of embodiments 1-5, wherein step i) takes place in an organic solvent selected from acyclic and cyclic ethers, toluene, dimethylformamide, NMP, acetonitrile or mixtures thereof; preferably in dioxane.

E7 The process according to any one of embodiments 1-6, wherein step i) comprises reaction of 4-chloro-5-nitropyridin-2(1H)-one (Compound I) with 4-fluoro-2-methylphenyl boronic acid (Compound II) to obtain 4-(4-fluoro-2-methylphenyl)-5-nitropyridin-2(1H)-one (Compound III); catalyzed by tetrakis(triphenylphosphine)palladium(0) in the presence of potassium carbonate, wherein step i) takes place in a solvent comprising 1,4-dioxane and at a temperature of 88-100° C.

E8 The process according to any one of embodiments 1-7, wherein step i) is followed by
i) reacting 4-(4-fluoro-2-methylphenyl)-5-nitropyridin-2(1H)-one (Compound III) obtained in step i) with POCl$_3$ to obtain 2-chloro-4-(4-fluoro-2-methylphenyl)-5-nitropyridine (Compound IV).

E9 A process for preparing Compound IX, said process comprising the following step: ii) reacting 4-(4-fluoro-2-methylphenyl)-5-nitropyridin-2(1H)-one (Compound III) obtained in step i) with POCl$_3$ to obtain 2-chloro-4-(4-fluoro-2-methylphenyl)-5-nitropyridine (Compound IV).

E10 A process for preparing Compound IX, said process comprising the following step: ii) reacting 4-(4-fluoro-2-methylphenyl)-5-nitropyridin-2(1H)-one (Compound III) with POCl$_3$ to obtain 2-chloro-4-(4-fluoro-2-methylphenyl)-5-nitropyridine (Compound IV).

E11 The process according to any one of embodiments 8-10, wherein step ii) takes place in a solvent comprising tetrahydrofuran, a halohydrocarbon, e.g. dichloromethane, N,N-dimethylformamide or dimethoxyethane, preferably in N,N-dimethylformamide or dimethoxyethane or mixture thereof.

E12 The process according to any one of embodiments 8-11, wherein step ii) takes place. at a temperature in the range of 20° to 75° C.

E13 The process according to any of embodiments 8-12, wherein step ii) is followed by step iii) comprising the reduction of said 2-chloro-4-(4-fluoro-2-methylphenyl)-5-nitropyridine Compound (IV) by catalytic hydrogenation to obtain 6-chloro-4-(4-fluoro-2-methylphenyl)pyridin-3-amine of formula (Compound V) or salts thereof.

E14 A process for preparing Compound IX, said process comprising the following step iii), reducing 2-chloro-4-(4-fluoro-2-methylphenyl)-5-nitropyridine (Compound IV) obtained in step (iii) by catalytic hydrogenation to obtain 6-chloro-4-(4-fluoro-2-methylphenyl)pyridin-3-amine of formula (Compound V) or salts thereof.

E15 A process for preparing Compound IX, said process comprising the following step iii), reducing 2-chloro-4-(4-fluoro-2-methylphenyl)-5-nitropyridine (Compound IV) by catalytic hydrogenation to obtain 6-chloro-4-(4-fluoro-2-methylphenyl)pyridin-3-amine (Compound V) or salts thereof.

E16 The process according to any one of embodiments 13-15, wherein said catalytic hydrogenation is carried out in the presence of catalysts selected from palladium or platinum on carbon, preferably platinum on carbon.

E17 The process according to any one of embodiments 13-16, wherein the platinum is present in an amount of 0.05 to 0.5 weights relative to Compound IV; preferably from 0.2 to 0.3 weights relative to Compound IV.

E18 The process according to any one of embodiments 13-17, wherein step (iii) takes place in alcohols, ethers, esters, hydrocarbons or mixtures thereof, preferably in esters and even more preferably ethyl acetate.

E19 The process according to any one of embodiments 13-18, wherein step (iii) takes place at room temperature.

E20 The process according to any one of embodiments 13-19, wherein the salts of Compound V are selected from maleate, hydrochloride, hydrobromide, phosphate, acetate, fumarate, salicylate, sulphate, citrate, lactate, mandelate, tartrate or methanesulphonate, preferably hydrochloride.

E21 The process according to any one of embodiments 13-20, wherein a solution of Compound V is reacting with hydrogen chloride gas in aqueous solution or in dioxane followed by treatment with acetonitrile to obtain Compound V as hydrochloride salt.

E22 The process according to any one of the embodiments 13-21, wherein step iii) is followed by iv): reacting 6-chloro-4-(4-fluoro-2-methylphenyl)pyridin-3-amine or a salt thereof Compound V obtaining in step iii) with 2-(3,5-bis(trifluoromethyl)phenyl)-2-methylpropanoyl chloride (Compound VI) to obtain 2-(3,5-bis(trifluoromethyl)phenyl)-N-(6-chloro-4-(4-fluoro-2-methylphenyl)pyridin-3-yl)-2-methyl-propanamide of formula (Compound VII).

E23 A process for preparing intermediate (IX), said process comprising the following step: iv): reacting 6-chloro-4-(4-fluoro-2-methylphenyl)pyridin-3-amine or a salt thereof (Compound V) obtained in step iii) with 2-(3,5-bis(trifluoromethyl)phenyl)-2-methylpropanoyl chloride (Compound VI) to obtain 2-(3,5-bis(trifluoromethyl)phenyl)-N-(6-chloro-4-(4-fluoro-2-methylphenyl)pyridin-3-yl)-2-methylpropanamide of formula (Compound VII).

E24 A process for preparing intermediate (IX), said process comprising the following step: iv): reacting 6-chloro-4-(4-fluoro-2-methylphenyl)pyridin-3-amine or a salt thereof (Compound V) with 2-(3,5-bis(trifluoromethyl)phenyl)-2-methylpropanoyl chloride (Compound VI) to obtain 2-(3,5-bis(trifluoromethyl)phenyl)-N-(6-chloro-4-(4-fluoro-2-methylphenyl)pyridin-3-yl)-2-methyl-propanamide of formula (Compound VII).

E25 The process according to any one of embodiments 22-24, wherein step iv) takes place in dichloromethane in the presence of an organic base.

E26 The process according to any one of embodiments 22-25, wherein step iv) takes place in the presence of an organic base selected from pyridine, triethylamine, diisopropylamine, N,N-diisopropylethylamine, 2,6-lutidine or a mixture thereof.

E27 The process according to any one of embodiments 22-26, wherein step iv) takes place at a temperature of 0-5° C.

E28 The process according to any one of embodiments 22-27, wherein step iv) is followed by v): reacting 2-(3,5-bis(trifluoromethyl)phenyl)-N-(6-chloro-4-(4-fluoro-2-methylphenyl)pyridin-3-yl)-2-methyl-propanamide (VII) obtained by step iv) with a methyl halide of formula $CH_3X$ (VIII) in the presence of cesium carbonate to Compound IX); wherein X is a halogen selected from chlorine, bromide or iodine.

E29 A process comprising the following step v): reacting 2-(3,5-bis(trifluoromethyl)phenyl)-N-(6-chloro-4-(4-fluoro-2-methylphenyl)pyridin-3-yl)-2-methyl-propanamide (Compound VII) obtained by step iv) with a methyl halide of formula $CH_3X$ (VIII) in the presence of cesium carbonate to obtain 2-(3,5-bis(trifluoromethyl)phenyl)-N-(6-chloro-4-(4-fluoro-2-methylphenyl)pyridin-3-yl)-N,2-dimethylpropanamide of formula (IX); wherein X is a halogen selected from chlorine, bromide or iodine.

E30 A process comprising the following step v): reacting 2-(3,5-bis(trifluoromethyl)phenyl)-N-(6-chloro-4-(4-fluoro-2-methylphenyl)pyridin-3-yl)-2-methyl-propanamide (Compound VII) with a methyl halide of formula $CH_3X$ (VIII) in the presence of cesium carbonate to obtain 2-(3,5-bis(trifluoromethyl)phenyl)-N-(6-chloro-4-(4-fluoro-2-methylphenyl)pyridin-3-yl)-N,2-dimethylpropanamide of formula (IX); wherein X is a halogen selected from chlorine, bromide or iodine.

E31 The process according to any one of embodiments 28-30, wherein step v) takes place in an organic bases selected from pyridine, triethylamine, diisopropylamine, N,N-diisopropylethylamine, 2,6-lutidine or in an organic base selected from potassium carbonate, cesium carbonate, potassium phosphate, sodium t-butoxide, potassium t-butoxide or a mixture thereof.

E32 The process according to any one of embodiments 28-31, wherein the step v) takes place in a solvent selected from DMF, acetonitrile or ethers.

E33 Process for manufacturing of Compound IX, said process comprising:
performing step i) according to any one of embodiments 1-7, followed by
performing step ii) according to any one of embodiments 8-12, followed by
performing step iii) according to any one of embodiments 13-21, followed by
performing step iv) according to any one of embodiments 22-27, followed by
performing step v) according to any one of embodiments 28-32.

E34 Compound IX obtained from the process according to any one of embodiments 1-33.

E35 The use of Compound IX obtained from the process according to any one of embodiments 1-33 for the manufacture of Compound A.

E36 Compound A obtained from Compound IX, wherein said Compound IX is prepared according to the process of any one of embodiments 1-33.

E37 A pharmaceutical composition comprising Compound A obtained from Compound IX, wherein said Compound IX is prepared according to the process of any one of embodiments 1-33.

E38 Compound A obtained from Compound IX, wherein said Compound IX is prepared according to the process of any embodiments 1-33, for use in the treatment of sex hormone disease or in the treatment or prevention of a condition or symptom associated with the perimenopause, the menopause, or the post menopause.

E39 Compound A obtained from Compound IX, wherein said Compound IX is prepared according to the process of any one of embodiments 1-33, for use in the treatment of sex hormone disease selected from hot flushes, polycystic ovary syndrome (PCOS), endometriosis, heavy menstrual bleeding, adenomyosis or uterine fibroids.

E40 Compound A obtained from Compound IX, wherein said Compound IX is prepared according to the process of any one of embodiments 1-33, for use in the treatment of a condition or a symptom associated with the perimenopause, the menopause, or the post menopause selected from a pathological gain of excess body fat and/or excess body weight, diabetes, fatigue, irritability, cognitive decline, hair-loss, dry skin, insomnia, sleep disturbances and night-time awakenings, anxiety and depression, decreases in sexual desire, vaginal dryness and pain, connective tissue loss and muscle bulk reduction, bone loss, urinary symptoms of urgency and dysuria, hot flushes, and night sweats.

E41 Compound A obtained from Compound IX, wherein said Compound IX is prepared according to the process of any one of embodiments 1-33, for use in the treatment of a condition or a symptom associated with the menopause caused by certain types of chemotherapy, e.g., aromatase inhibitors such as anastrozole, exemestane, letrozole and testolactone; gonadotropin-releasing hormone receptor agonists such as such as leuprolide, buserelin, histrelin, goserelin, deslorelin, nafarelin and triptorelin; gonadotropin-releasing hormone receptor antagonists such as ASP1701, elagolix, relugolix and linzagolix (OBE2109); selective estrogen receptor modulators (SERMs) such as bazedoxifene, clomifene, cyclofenil, tamoxifen, ormeloxifene, toremifene, raloxifene, lasofoxifene and ospemifene; selective estrogen receptor degraders (SERDs) such as fulvestrant, brilanestrant and elacestrant; CYP17A1 inhibitors such as abiraterone, ketoconazole and seviteronel; and combined androgen receptor blockers and CYP17A1 inhibitors such as galeterone.

E42 Compound A obtained from Compound IX, wherein said Compound IX is prepared according to the process of any one of embodiments 1-33, for use in the treatment of a condition or a symptom associated with andropause selected from a pathological gain of excess body fat and/or excess body weight, diabetes, fatigue, irritability, cognitive decline, hair-loss, dry skin, insomnia, sleep disturbances and night-time awakenings, anxiety and depression, decreases in sexual desire, connective tissue loss and muscle bulk reduction, urinary symptoms of urgency and dysuria, hot flushes and night sweats.

E43 Compound A obtained from Compound IX, wherein said Compound IX is prepared according to the process of any one of embodiments 1-33, for use in the treatment of a condition or a symptom associated with the andropause caused by certain androgen deprivation therapies eg gonadotropinreleasing hormone receptor agonists such as such as leuprolide, buserelin, histrelin, goserelin, deslorelin, nafarelin and triptorelin; gonadotropin-releasing hormone receptor antagonists such as ASP1701, elagolix, relugolix and linzagolix (OBE2109); antiandrogens (androgen receptor blockers) such as cyproterone acetate, apalutamide, bicalutamide, darolutamide, enzalutamide, flutamide, nilutamide; CYP17A1 inhibitors such as abiraterone, ketoconazole and seviteronel; and combined androgen receptor blockers and CYP17A1 inhibitors such as galeterone.

E44 Compound A obtained from Compound IX, wherein said Compound IX is prepared according to the process of any one of embodiments 1-33, for use in the treatment of a "leptin-related disease" selected from metabolic disorders such as diabetes, cardiovascular disease, obesity, excessive eating, hypertension, metabolic syndrome and inflammatory disorders.

E45 Compound A obtained from Compound IX, wherein said Compound IX is prepared according to the process of any one of embodiments 1-33, for use in the treatment of a 'weight-related disease' selected from a genetic susceptibility to excess body weight, obesity associated with metabolic disorders, or a condition for which a decreased body weight would be of therapeutic benefit.

E46 Compound A obtained from Compound IX, wherein said Compound IX is prepared according to the process of any one of embodiments 1-33, for use in the treatment of a "disorder of pregnancy" selected from eclampsia, pre-eclampsia, gestational diabetes mellitus, high blood pressure, morning sickness, hyperemesis gravidarum, miscarriage, pelvic girdle pain, and premature birth.

E47 A pharmaceutical composition comprising Compound A obtained from intermediate (IX), wherein said Compound IX is prepared according to the process of any embodiments 1-33, for use in the treatment of sex hormone disease or in the treatment or prevention of a condition or symptom associated with the perimenopause, the menopause, or the post menopause.

E48 A pharmaceutical composition comprising Compound A obtained from Compound IX, wherein said Compound IX is prepared according to the process of any embodiments 1-33, for use in the treatment of sex hormone disease.

E49 A pharmaceutical composition comprising Compound A obtained from Compound IX, wherein said Compound IX is prepared according to the process of any embodiments 1-33, for use in the treatment of a condition or a symptom associated with the perimenopause, the menopause or the post menopause.

E50 A pharmaceutical composition comprising Compound A obtained from Compound IX, wherein said Compound IX is prepared according to the process of any one of embodiments 1-33, for use in the treatment of sex hormone disease selected from hot flushes, polycystic ovary syndrome (PCOS), endometriosis, heavy menstrual bleeding, adenomyosis or uterine fibroids.

E51 A pharmaceutical composition comprising Compound A obtained from Compound IX, wherein said Compound IX is prepared according to the process of any one of embodiments 1-33 and one or more of pharmaceutically acceptable excipient, carrier, and/or diluent.

E52 Compound III.

E53 Compound IV.

E54 Salts of Compound V.

E55 Compound VII.

E56 Use of a compound of formula (III), (IV), (V) or (VII) in the preparation of Compound A.

EXAMPLES

The invention will be illustrated by the following non-limiting examples. The following examples are intended for illustration only and are not intended to limit the scope of the invention in any way.

In the procedures that follow, after each starting material, reference to a description is typically provided. This is provided merely for assistance to the skilled chemist. The starting material may not necessarily have been prepared from the batch referred to.

As used herein the symbols and conventions used in these processes, schemes and examples are consistent with those used in the contemporary scientific literature, for example, the *Journal of the American Chemical Society* or the *Journal of Biological Chemistry*.

Specifically, the following abbreviations may be used in the examples and throughout the specification:
g (grams); mg (milligrams);
L (litres); mL (millilitres);
M (molar); mM (millimolar);
kg (kilogram) mol (moles)
w/w (weight/weight) MS (mass spectrometry);
mmol (millimoles); RT (room temperature);
min (minutes); h or hrs (hours);
NMP (N-methyl-2-pyrrolidone) THF (tetrahydrofuran);
DMSO (dimethyl sulfoxide); EtOAc (ethyl acetate);
DME (1,2-dimethoxyethane); DCM (dichloromethane);
DMF (N,N-dimethylformamide) MS (mass spectrometry);
HPLC (High Performance Liquid Chromatography);

Unless otherwise indicated, all temperatures are expressed in ° C. (degrees Centigrade). All reactions conducted under an inert atmosphere at room temperature unless otherwise noted.

In the Examples unless otherwise stated:
1H-QNMR

Quantitative NMR was conducted as per standard 1H NMR but utilizing an internal standard to allow for estimation of product assay.
HPLC The purity is determined by reversed-phase HPLC. A C18 stationary phase is employed using an acidified aqueous mobile phase with an acetonitrile organic modifier. Elution is performed in gradient mode.

Example 1

Preparation of 4-(4-fluoro-2-methylphenyl)-5-nitropyridin-2(1H)-one (Compound III)

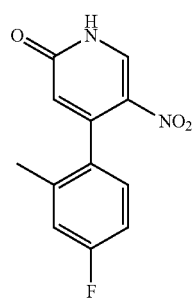 [SMILES: Cc1cc(F)ccc1-c1cc(=O)[nH]cc1[N+](=O)[O-]]

A three-necked flask, connected to a condenser and a vacuum/nitrogen line, was charged with 4-chloro-5-nitropyridin-2(1H)-one (39.0 g, 223 mmol, commercial from Leapchem), (4-fluoro-2-methylphenyl)boronic acid (39.6 g, 257 mmol; commercially available e.g. from Sigma Aldrich), potassium carbonate (92.6 g, 670 mmol) and 1,4-dioxane (480 mL). After evacuating and back-filling with nitrogen three times, tetrakis(triphenylphosphine)palladium(0) (12.9 g, 11.2 mmol) was added under a stream of nitrogen and the resulting mixture was stirred at mild reflux (99° C. internal temperature) for 18 h. The reaction mixture was cooled down to room temperature and filtered. The precipitate was washed with dioxane (300 mL) and the filtrate was discarded. The precipitate was then washed with MeOH (2×200 mL), the filtrate was collected, concentrated in vacuo and dried to obtain the title compound as dark yellow solid (78.0 g, 314 mmol, Yield 141% w/w) with a 60% purity according to $^1$H-QNMR. The compound was used for the next step without further purification. 1H NMR (d-DMSO) δ/ppm 8.88 (s, 1H), 6.96~7.06 (m, 3H), 0.44 (s, 1H), 2.03 (s, 3H, —CH3).

Example 2

Preparation of 2-chloro-4-(4-fluoro-2-methylphenyl)-5-nitropyridine (Compound IV)

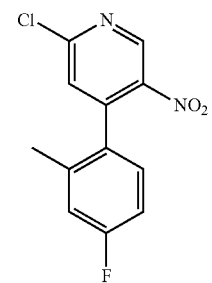 [SMILES: Cc1cc(F)ccc1-c1cc(Cl)ncc1[N+](=O)[O-]]

4-(4-fluoro-2-methylphenyl)-5-nitropyridin-2(1H)-one (78.0 g, 60% w/w, 0.19 mol) was suspended in DME (600 mL) in a three-necked flask, under nitrogen. POCl$_3$ (0.10 kg, 61 mL, 0.65 mol) was added dropwise (reaction slightly exothermic, temperature rose to 40° C.) followed by DMF (14 g, 15 mL, 0.19 mol). The resulting mixture was stirred at 70° C. (internal temperature) for 18 h. The reaction mixture was cooled down to room temperature and slowly poured in water (600 mL) (exothermic, cooled with an ice/water bath). The pH was neutralized with solid Na$_2$CO$_3$, the mixture was transferred to a separating funnel and extracted with EtOAc (2×600 mL). The organic layer was collected, washed with brine, dried over Na$_2$SO$_4$, filtered and concentrated in vacuo to obtain the title compound as a brown solid (46.2 g, 173 mmol, Yield 91% w/w) with 86% purity (HPLC). 1H NMR (CDCl3) δ/ppm 9.05 (s, 1H), 7.34 (s, 1H), 6.9-77.08 (m, 3H), 2.13 (s, 3H, —CH3);

Example 3

Preparation of 6-chloro-4-(4-fluoro-2-methylphenyl)pyridin-3-amine hydrochloride (Compound V)

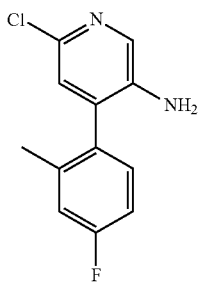 [SMILES: Cc1cc(F)ccc1-c1cc(Cl)ncc1N]

A flask for the hydrogenation Parr apparatus was charged with platinum on carbon (5.4 g, 5% w/w, 1.4 mmol). EtOAc (400 mL) was added under a stream of $N_2$, followed by 2-chloro-4-(4-fluoro-2-methylphenyl)-5-nitropyridine (23.0 g, 80% w/w, 69 mmol). The flask was transferred to the Parr apparatus and mechanically stirred at room temperature under 3 bar hydrogen. After 48 h, more platinum on carbon (2.7 g, 5% w/w, 0.7 mmol) was added because HPLC-MS showed that the reaction was not proceeding further. The mixture was stirred under 3 bar H2 for 96 h when HPLC-MS showed no progress in the conversion. Additional platinum on carbon (2.7 g, 5% w/w, 0.7 mmol) was added and the reaction was stirred under 3.5 bar $H_2$ for 24 h. The reaction mixture was filtered over Celite and concentrated in vacuo. The crude product was dissolved in EtOAc (200 mL) and the resulting solution was cooled down to 0° C. A 4N solution of HCl in dioxane (55 mL, 220 mmol) was slowly added and the solution was stirred at room temperature for 18 h. The mixture was concentrated in vacuo and the resulting brown solid was suspended in acetonitrile (220 mL). The suspension was heated to reflux while stirring. After cooling down to room temperature, the solid was collected by filtration and dried to give the title compound as an off-white solid (13.6 g, 49.7 mmol, Yield 72% w/w) with a 95.7% purity (HPLC). 1H NMR (d-DMSO) δ/ppm 9.95 (s, 2H, —NH2), 8.54 (s, 1H), 7.23~7.43 (m, 3H), 7.13 (s, 1H), 2.15 (s, 3H, —CH3);

Example 4

Preparation of 2-(3,5-bis(trifluoromethyl)phenyl)-N-(6-chloro-4-(4-fluoro-2-methylphenyl)pyridin-3-yl)-2-methyl-propanamide (Compound VII)

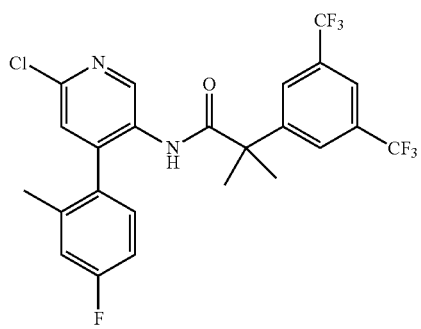 [SMILES: Cc1cc(F)ccc1-c1cc(Cl)ncc1NC(=O)C(C)(C)c1cc(C(F)(F)F)cc(C(F)(F)F)c1]

Preparation 1

A three-necked flask, connected to a nitrogen line, was charged with 2-(3,5-bis(trifluoromethyl)phenyl)-2-methylpropanoic acid (30.56 g, 95% w/w, 96.7 mmol) and DCM (400 mL). The solution was cooled down to 0° C. with an ice/water bath. Oxalyl chloride (13.5 g, 9.31 mL, 106 mmol) was slowly added, followed by DMF (1.41 g, 1.5 mL, 19.3 mmol) and the resulting mixture was stirred at room temperature for 4 h. The reaction mixture was concentrated in vacuo to give 2-(3,5-bis(trifluoromethyl)phenyl)-2-methylpropanoyl chloride as pale yellow oil containing some solid particles (34.5 g, 106 mmol, Yield 110% w/w). This material was used directly in the following step.

Example 3 (6-chloro-4-(4-fluoro-2-methylphenyl)pyridin-3-amine hydrochloride (Compound V)) (27.0 g, 97.9 mmol) was added portionwise (slightly exothermic) to a three-necked flask containing pyridine (139 g, 0.14 L, 1.76 mol) at 0° C. and under $N_2$. A suspension of 2-(3,5-bis(trifluoromethyl)phenyl)-2-methylpropanoyl chloride (34.5 g, 95%, 103 mmol) in DCM (20 mL) was added dropwise at 0° C. and the resulting mixture was stirred at room temperature for 18 h. The mixture was diluted with EtOAc/Water (700 mL each) and transferred to a separating funnel. The organic layer was collected, washed with water and brine, dried over $Na_2SO_4$, filtered and concentrated in vacuo to obtain the title product as an orange oil, which solidified upon standing, (52.5 g, 100 mmol, Yield 102% w/w) with a 93% purity (HPLC). The compound was used for the next step without further purification.

Preparation 2

2-(3,5-bis(trifluoromethyl)phenyl)-2-methylpropanoic acid (15.3 kg) and DCM (11.0 L/kg of 2-(3,5-bis(trifluoromethyl)phenyl)-2-methylpropanoic acid) were loaded. After cooling down to −5/5° C., DMF (0.01 L/kg of 2-(3,5-bis(trifluoromethyl)phenyl)-2-methylpropanoic acid) was loaded and oxalyl chloride (1.02 mol/mol) added keeping the temperature below 10° C. The addition vessel employed was rinsed with DCM (1.0 L/kg of 2-(3,5-bis(trifluoromethyl)phenyl)-2-methylpropanoic acid) and the reaction mixture warmed to 20/25° C. and stirred for at least 2 h.

After reaction completion, the reaction mixture was concentrated to 2.0 L/Kg of 2-(3,5-bis(trifluoromethyl)phenyl)-2-methylpropanoic acid. Then, DCM (2.0 L/kg of 2-(3,5-bis(trifluoromethyl)phenyl)-2-methylpropanoic acid) was added and the 2-(3,5-bis(trifluoromethyl)phenyl)-2-methylpropanoyl chloride solution stored under $N_2$ was employed in the next step.

Example 3 (6-chloro-4-(4-fluoro-2-methylphenyl)pyridin-3-amine hydrochloride (Compound V)) (11.9 kg) and DCM (2.7 L/kg of Example 3) were loaded. After cooling down to −5/5° C., pyridine (3.00 mol/mol of Example 3) was added keeping temperature below 10° C. Next, 2-(3,5-bis(trifluoromethyl)phenyl)-2-methylpropanoyl chloride solution in DCM was added keeping the temperature below 10° C. The addition vessel was rinsed with DCM (0.3 L/kg of Example 3). Reaction mixture was warmed to 20/25° C. and stirred for not less than 18 h.

After reaction completion, the reaction mixture was cooled down to 10° C. and water (8.0 L/kg of Example 3) added keeping the temperature below 20° C. After stirring for an additional 30 min at 20/25° C., layers were separated and the aqueous layer re-extracted with DCM (4.0 L/kg of Example 3).

The combined organic layers were washed with water (2×5.0 L/kg of Example 3 and concentrated under vacuum to 2.7 L/kg of Example 3. Then, heptane (8.5 L/kg of Example 3) was added keeping the temperature at 35-45° C.

and 2-(3,5-bis(trifluoromethyl)phenyl)-N-(6-chloro-4-(4-fluoro-2-methylphenyl)pyridin-3-yl)-2-methyl-propanamide (0.005 w/w of Example 3) was charged for seeding.

The seeded mixture was aged for not less than 1 h at 40° C. and the resultant slurry concentrated under vacuum to 10.0 L/kg of Example 3. Additional heptane (2.0 L/kg of Example 3) was added at 35/45° C. The slurry was cooled down to 10/20° C. in not less than 2 h and kept at 10/20° C. for not less than 2 h before proceeding with the centrifugation step.

The slurry was centrifuged and the cake washed with heptane (2.0 L/kg of Example 3).

The wet product was dried under vacuum at not more than 45° C. to obtain 19.9 kg of the title compound (Yield=88.1%) with a 99.87% purity as an off-white solid.

$^1$H NMR (DMSO-d$_6$): δ 8.99 (s, 1H), 8.36 (s, 1H), 7.98 (s, 1H), 7.74 (s, 2H), 7.43 (s, 1H), 7.00-6.95 (m, 2H), 6.90-6.85 (m, 1H), 1.98 (s, 3H), 1.44 (s, 6H).

Example 5

Preparation of 2-(3,5-bis(trifluoromethyl)phenyl)-N-(6-chloro-4-(4-fluoro-2-methylphenyl)pyridin-3-yl)-N,2-dimethylpropanamide (Compound IX)

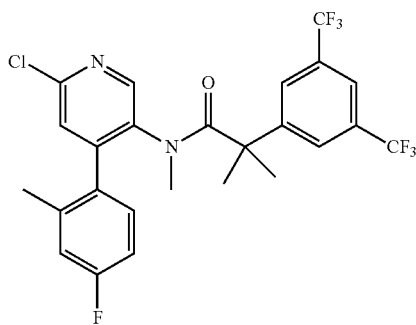 [SMILES: Cc1cc(F)ccc1-c1cc(Cl)ncc1N(C)C(=O)C(C)(C)c1cc(C(F)(F)F)cc(C(F)(F)F)c1]

Preparation 1

A three-necked flask, connected to a nitrogen line, was charged with Example 4 preparation 1 (52.0 g, 95%, 95 mmol), DMF (300 mL) and cesium carbonate (62 g, 0.19 mol). The resulting mixture was cooled down to 0° C. before adding methyl iodide (14 g, 6.3 mL, 0.10 mol) dropwise over 5 min. The resulting mixture was allowed to warm to room temperature and stirred for 18 hours. The reaction mixture was poured into water (600 mL) and extracted with EtOAc (2×600 mL). The organic layer was collected, washed successively with water and brine, dried over Na$_2$SO$_4$, and filtered. The solvent was evaporated in vacuo and the residue dried to obtain a dark brown solid. The solid was suspended in heptane (500 mL) and stirred for 30 min. The suspension was filtered, the pale brown solid was collected and dried in vacuo. The brown color was removed by dissolving the product in EtOAc (200 mL) and filtering over a short pad of silica. The filtrate was collected and concentrated in vacuo to give the title product as a pale yellow solid (34.1 g, 64 mmol, Yield 67% w/w) with a 96.7% purity (HPLC).

Preparation 2

Example 4 (2-(3,5-bis(trifluoromethyl)phenyl)-N-(6-chloro-4-(4-fluoro-2-methylphenyl)pyridin-3-yl)-2-methyl-propanamide (Compound VII)) from preparation 2 (19.9 kg), Cs$_2$CO$_3$ (1.19 kg/kg of Example 4) and DMF (5.0 L/kg of Example 4) were loaded. After cooling down to −5/5° C., methyl iodide (1.10 mol/mol of Example 4) is added keeping temperature below 10° C. The addition vessel was rinsed with DMF (0.8 L/kg of Example 4). Reaction mixture was warmed to 20/25° C. and stirred for not less than 18 h.

After reaction completion, the reaction mixture was cooled down to 10° C. and water (12.0 L/kg of Example 4) and ethyl acetate (12.0 L/kg of Example 4) added keeping the temperature below 20° C. After stirring for an additional 15 min at 20/25° C., the layers were separated and the aqueous layer was re-extracted with ethyl acetate (12.0 L/kg of Example 4).

The combined organic layers were washed with water (12.0 L/kg of Example 4) and NaCl 20 wt % solution (5.0 kg/kg of Example 4). After distilling under vacuum to (2.0 L/kg of Example 4), heptane (9.0 L/kg of Example 4) was added at 35/45° C. The slurry was stirred at 40° C. for not less than 2 h, cooled down to 10/20° C. in not less than 2 h and aged at 10/20° C. for not less than 2 h before proceeding with the centrifugation.

The slurry was centrifuged and the cake washed with heptane (2.0 L/kg of Example 4).

The wet product was dried under vacuum at NMT 45° C. to obtain 14.2 kg of the title compound as a white solid (yield=69.4%) with a 99.99% purity. $^1$H NMR (DMSO-d$_6$ δ 8.32 (s, 1H), 8.03 (s, 1H), 7.74 (broad s, 2H), 7.55 (s, 1H), 7.30-7.00 (broad+d, 3H), 2.90-2.40 (broad m, 3H), 2.15 (broad m, 3H), 1.70-1.20 (broad m, 6H).

Example 6

Method of Preparation of N-(6-((7S,9aS)-7-((benzyloxy)methyl)hexahydropyrazino[2,1-c][1,4]oxazin-8(1H)-yl)-4-(4-fluoro-2-methylphenyl)pyridin-3-yl)-2-(3,5-bis(trifluoromethyl)phenyl)-N,2-dimethylpropanamide (Compound XI)

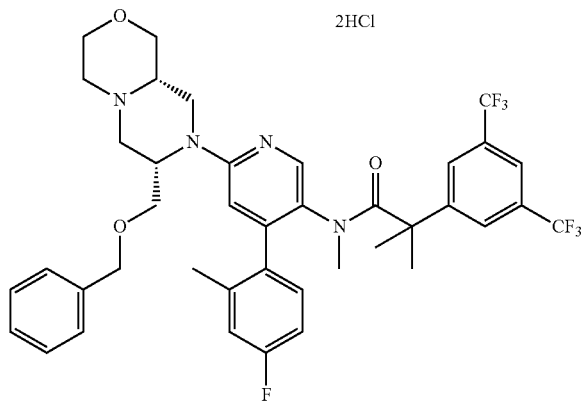 [SMILES: Cc1cc(F)ccc1-c1cc(N2C[C@H]3COCCN3C[C@H]2COCc2ccccc2)ncc1N(C)C(=O)C(C)(C)c1cc(C(F)(F)F)cc(C(F)(F)F)c1]

Preparation 1

A three-necked flask connected to a thermometer, a condenser and to nitrogen, was charged with Example 5 (2-(3,5-bis(trifluoromethyl)phenyl)-N-(6-chloro-4-(4-fluoro-2-methylphenyl)pyridin-3-yl)-N,2-dimethylpropanamide (Compound IX)) (643 mg, 1.21 mmol), sodium tert-butoxide (218 mg, 2.66 mmol) and Bis(tri-tert-butylphosphine)palladium(0) (0.16 mmol, 62 mg). A solution of (7S,9aS)-7-((benzyloxy)methypoctahydropyrazino[2,1-c][1,4]oxazine (380 mg, 1.45 mmol) in toluene was added and the reaction mixture was stirred at 85° C. for 18 h. The mixture was cooled down and filtered over Celite. The filtrate was collected, transferred to a separating funnel, washed with water and brine, dried over $Na_2SO_4$, filtered and concentrated. The residue was purified by silica gel column chromatography to obtain the title compound as brownish solid (610 mg, 0.8 mmol, Yield 67% w/w).

Preparation 2

(7S,9aS)-7-((benzyloxy)methypoctahydropyrazino [2,1-c][1,4]oxazine

A solution of (7S,9aS)-7-((benzyloxy)methypoctahydropyrazino[2,1-c][1,4]oxazine dioxalate salt (1.26 mol/mol of Example 5 from Preparation 2), toluene (20.0 L/kg of Example 5) and NaOH 1N (20.0 L/kg of Example 5) were loaded. The mixture was heated to 75° C. and stirred for not less than 5 min. The layers were settled for not less than 30 min and the bottom aqueous layer discarded. The organic layer was cooled down to 25° C. and water (10.0 L/kg of Example 5) was added. The mixture was stirred for not less than 10 min, the layers settled for not less than 15 min and the bottom aqueous layer discarded.

The organic layer was concentrated to 8.0 L/kg of Example 5 under vacuum, toluene (4.0 L/kg of Example 5) was added and distilled again under vacuum to 8.0 L/kg of Example 5. A sample was taken for Karl-Fischer (KF) determination. If KF passed, additional toluene (8.0 L/kg of Example 5) was added. If not, toluene was again added (4.0 L/kg of Example 5) and the distillation step to 8.0 L/kg of Example 5 was repeated.

In another reactor, Example 5 (2-(3,5-bis(trifluoromethyl)phenyl)-N-(6-chloro-4-(4-fluoro-2-methylphenyl)pyridin-3-yl)-N,2-dimethylpropanamide (Compound IX)) from Preparation 2 (3.2 kg), sodium tert-butoxide (1.75 mol/mol of Example 5) and Palladium bis(tri-t-butylphosphine) (0.10 mol/mol of Example 5) were loaded. (7S,9aS)-7-((benzyloxy)methypoctahydropyrazino[2,1-c][1,4]oxazine free base/toluene solution was loaded and the transfer line rinsed with toluene (2.0 L/kg of Example 5)). The reaction mixture was heated to 85° C. and stirred for not less than 4 h before sampling for reaction completion.

The reaction mixture was cooled down to 25° C. and $NaHSO_3$ 20 wt % solution (8.7 L/kg of Example 5) loaded. The mixture was heated to 60° C. for not less than 1 h and cooled down again to 25° C. After filtering the batch through K100 paper d washing the filter and transfer line with toluene (1.0 L/kg of Example 5, the layers were settled for not less than 30 min at 25° C. and the bottom aqueous layer discarded. 5 wt % L-Cysteine solution (10.0 kg/kg of Example 5) was loaded over the organic layer. The mixture was heated to 60° C. for not less than 1 h and cooled down again to 25° C. After filtering the batch through K100 paper and washing the filter and transfer line with toluene (1.0 L/kg of Example 5), 10 wt % NaCl solution was added, the layers stirred for not less than 15 min and settled for not less than 30 min at 25° C. Finally, the bottom aqueous layer was discarded. 5 wt % L-Cysteine solution (10.0 kg/kg of Example 5) was loaded over the organic layer. The mixture was heated to 60° C. for not less than 1 h and cooled down again to 25° C. After filtering the batch through K100 paper and washing the filter and transfer line with toluene (1.0 L/kg of Example 5), 10 wt % NaCl solution was added, the layers stirred for not less than 15 min and settled for not less than 30 min at 25° C. Finally, the bottom aqueous layer was discarded. The organic layer was washed with $NaHCO_3$ 5 wt % solution and two times with NaCl 2 wt % solution.

The resulting organic layer was concentrated to 4.0 L/kg of Example 5 under vacuum. Toluene (7.0 L/kg of Example 5) was charged and the solution sampled for KF analysis.

After heating the batch to 40° C., 4M HCl/dioxane solution (1.03 kg/kg of Example 5) and toluene (9.0 L/kg of Example 5) were added at 35/45° C. The solution was held at 40° C. for not less than 30 min and concentrated to 10.0 L/kg of Example 5 under vacuum. Toluene (9.0 L/kg of Example 5) was loaded and distilled again to 10.0 L/kg of Example 5. This last operation was repeated one more time and the obtained solution sampled for gas chromatography analysis.

The batch temperature was adjusted to 25° C. and n-heptane (7.0 L/kg of Example 5) added keeping the internal temperature at 20/30° C. The slurry was held at 20/30° C. for not less than 4 h before proceeding with the centrifugation step.

The slurry was centrifuged and the cake washed with n-heptane (4.0 L/kg of Example 5).

The wet product was dried under vacuum at 35° C. to obtain 4.4 kg of the title compound (yield=88.2%) with a 97.4% purity as a light brown solid.

NMR spectrometer: Varian Agilent Mercury Vx 400 (16 scans, sw 6400 Hz, 25° C.

$^1$H NMR (400 MHz, DMSO-$d_6$): δ 11.66 (bd, 1H), 8.02 (s, 1H), 7.95 (s, 1H), 7.74 (bd, 2H), 7.36-6.93 (m, 8H), 6.83 (s, 1H), 4.97 (bd, 1H), 4.62 (m, 1H), 4.50 (d, 11.8 Hz, 1H), 4.44-4.10 (m, 7H), 4.08-3.69 (m, 3H), 3.60 (d, 12.8 Hz, 1H), 3.45 (d, 11.8 Hz, 1H), 3.30 (d, 9.7 Hz, 1H), 3.19 (t, 10.7 Hz, 1H), 3.05 (m, 1H), 2.30-1.90 (m, 4H), 1.57-1.12 (m, 6H).

Example 7

2-[3,5-Bis(trifluoromethyl)phenyl]-N-{4-(4-fluoro-2-methylphenyl)-6-[(7S,9aS)-7-(hydroxymethyl) hexahydropyrazino[2,1-c][1,4]oxazin-8(1H)-yl]-3-pyridinyl}-N,2-dimethylpropanamide dihydrochloride salt mono-isopropanol solvate (Compound XII)

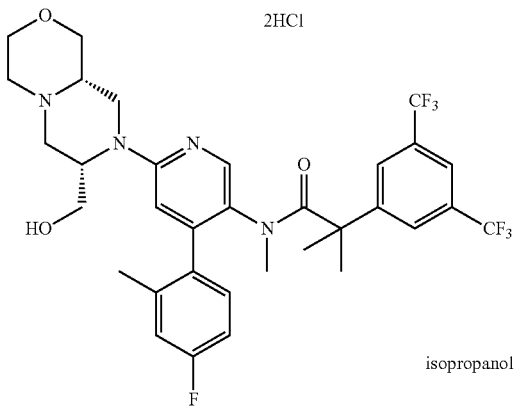 [SMILES: Cc1cc(F)ccc1-c1cc(N2C[C@H]3COCCN3C[C@H]2CO)ncc1N(C)C(=O)C(C)(C)c1cc(C(F)(F)F)cc(C(F)(F)F)c1]

Example 6 (N-(6-((7S,9aS)-7-((benzyloxy)methyl)hexahydropyrazino[2,1-c][1,4]oxazin-8(1H)-yl)-4-(4-fluoro-2-methylphenyl)pyridin-3-yl)-2-(3,5-bis(trifluoromethyl)phenyl)-N,2-dimethylpropanamide (Compound XI)) (4.4 kg), activated charcoal Norit DARCO G60 (0.10 kg/kg of Example 6, isopropanol (22.9 L/kg of Example 6), water (2.5 L/kg of Example 6) and HCl 35 wt % (4.0 mol/mol of Example 6) were loaded to the hydrogenator. The mixture was heated to 50° C. and stirred for not less than 30 min. Next, Pd/C 10% (0.20 kg/kg of Example 6) was slurred in isopropanol (20.4 L/kg of Example 6), loaded to the hydrogenator and rinsed with additional isopropanol (8.9 L/kg of Example 6). Hydrogenation conditions were set-up (2.00 BarG, 50° C.) and kept until hydrogen consumption was not observed.

Once the reaction was completed, the batch was filtered through Veladisc® filter housing equipped with a SUPRAdisc™ cartridge and washed with a mixture of isopropanol (9.0 L/kg of Example 6) and water (1.0 L/kg of Example 6).

The filtrate was concentrated under vacuum to 3.5 L/kg of Example 6. Isopropanol (10.0 L/kg of Example 6) was added and distilled again to 3.5 L/kg of Example 6. Isopropanol (10.0 L/kg of Example 6) was added and distilled again to 3.5 L/kg of Example 6. Isopropanol (8.5 L/kg of Example 6 was added and a sample was taken for KF analysis.

If KF analysis passed the specification criteria, dioxane/HCl 4M (2.00 mol/mol of Example 6) was added at 20/30° C. and the mixture heated to 65° C. for not less than 30 min. Next, the batch was cooled down to 25° C. in not less than 60 min and iso-octane (5.0 L/kg of Example 6) added at 20/30° C. in not less than 30 min. The slurry was held at 25° C. for not less than 5 h before proceeding with the centrifugation step.

The slurry was centrifuged and the cake washed with a mixture of isopropanol (2.0 L/kg Example 6) and iso-octane (2.0 L/kg of Example 6).

The wet product was dried under vacuum at 35° C. to obtain 3.5 kg of the title compound (yield=82.1%) with a 99.3% purity as a beige solid.

NMR spectrometer: Varian Agilent Mercury Vx 400 (16 scans, sw 6400 Hz, 25° C.

$^1$H NMR (400 MHz, DMSO-d$_6$): δ 11.34 (bd, 1H), 8.02 (s, 1H), 7.96 (bd s, 1H), 7.22-7.00 (m, 3H), 6.91 (s, 1H), 4.68 (bd s, 1H), 4.49 (bd, 1H), 4.20 (t, 12.2 Hz, 1H), 4.07-3.90 (m, 3H), 3.84 (m, 1H), 3.77 (hept., 6.1 Hz, 1H), 3.64 (d, 12.6 Hz, 1H), 3.43 (m, 2H), 3.28 (m, 1H), 3.16 (m, 2H), ca. 2.58 (bd, 2H), 2.41-2.00 (m, 5H), 1.60-1.10 (m, 6H), 1.03 (d, 6.1 Hz, 6H).

Example 8

2-[3,5-Bis(trifluoromethyl)phenyl]-N-{4-(4-fluoro-2-methylphenyl)-6-[(7S,9aS)-7-(hydroxymethyl)hexahydropyrazino[2,1-c][1,4]oxazin-8(1H)-yl]-3-pyridinyl}-N,2-dimethylpropanamide as anhydrous crystalline form (Compound A)

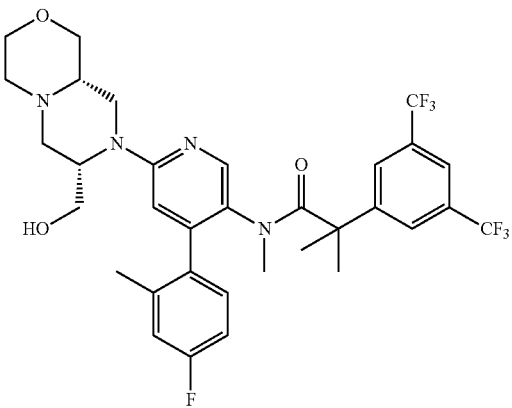 [SMILES: Cc1cc(F)ccc1-c1cc(N2C[C@H]3COCCN3C[C@H]2CO)ncc1N(C)C(=O)C(C)(C)c1cc(C(F)(F)F)cc(C(F)(F)F)c1]

Example 7 (2-[3,5-Bis(trifluoromethyl)phenyl]-N-{4-(4-fluoro-2-methylphenyl)-6-[(7S,9aS)-7-(hydroxymethyl)hexahydropyrazino[2,1-c][1,4]oxazin-8(1H)-yl]-3-pyridinyl}-N,2-dimethylpropanamide dihydrochloride salt monoisopropanol solvate (Compound XII)) (3.4 kg), methyl-t-butyl ether (from now on, MTBE) (15.0 L/kg of Example 7) and NaOH 2.5N (4.9 L/kg of Example 7) were loaded, heated to 40° C. and stirred for 10 to 30 min. The layers were settled for not less than 30 min at 40° C. and the bottom aqueous layer discarded.

An aqueous solution of L-cysteine 9 wt % (5.0 L water per kg of Example 7+0.5 w/w L-cysteine per Example 7) was added over the organic layer and stirred at 40° C. for not less than 60 min. The layers were settled for not less than 30 min at 40° C. and the bottom aqueous layer discarded.

Water (5.0 L/kg of Example 7) was added over the organic layer and stirred at 40° C. for not less than 15 min. The layers were settled for not less than 60 min at 40° C. and the bottom aqueous layer discarded.

Water (5.0 L/kg of Example 7) was added over the organic layer and stirred at 40° C. for not less than 15 min. The layers were settled for not less than 60 min at 40° C. and the bottom aqueous layer discarded.

The organic layer was concentrated at atmospheric pressure to 2.5 L/kg of Example 7. Iso-octane (8.3 L/kg of Example 7) was added at 50/55° C. in not less than 1 h and the solution distilled under light vacuum to 4.0 L/kg of Example 7. A sample was taken for controlling the water and MTBE removal.

Isopropanol (0.8 L/kg of Example 7) was added and stirred at 65/75° C. until total dissolution. The solution was cooled down to 45/55° C. and filtered to remove any foreign matters. Iso-octane (4.5 L/kg of Example 7) was added and the batch heated to 70° C. for not less than 30 min. The solution was cooled down to 50° C. and seeded with a slurry of 2-[3,5-Bis(trifluoromethyl)phenyl]-N-{4-(4-fluoro-2-methylphenyl)-6-[(7S,9aS)-7-(hydroxymethyl)hexahydropyrazino[2,1-c][1,4]oxazin-8(1H)-yl]-3-pyridinyl}-N,2-dimethylpropanamide (0.008% w/w of Example 7) in iso-octane (0.07 L/kg of Example 7) and isopropanol (0.01 L/kg of Example 7). The seeds were aged at 50° C. for not less than 3 h and additional iso-octane (4.2 L/kg of Example 7) was added in not less than 3 h keeping the temperature at 50/55° C. The slurry was held at 50° C. for not less than 8 h, cooled down to 0° C. in not less than 5 h and aged for not less than 3 h before proceeding with the centrifugation step.

The slurry was centrifuged and the cake washed with iso-octane (2×3.3 L/kg of Example 7).

The wet product was dried under vacuum at 50° C. to obtain 2.34 kg of the title compound (yield=82.7%). This product was sieved for delumping to obtain 2.26 kg of the title compound with a 99.8% purity as a white powder.

NMR spectrometer: Varian Agilent Mercury Vx 400 (16 scans, sw 6400 Hz, 25° C.).

$^1$H NMR (400 MHz, DMSO-d$_6$): δ 8.02 (s, 1H), 7.85 (s, 1H), 7.74 (bd, 2H), 7.22-6.92 (m, 3H), 6.61 (s, 1H), 4.70 (m, 1H), 4.21 (bd, 1H), 4.09 (bd, 1H), 3.75 (m, 3H), 3.55 (td, 11.3 Hz, 2.2 Hz, 1H), 3.40 (bd, 1H), 3.15 (t, 10.5 Hz, 1H), 3.02 (d, 11.3 Hz, 1H), 2.63 (d, 11.3 Hz, 1H), ca. 2.5 (bd, 2H), 2.31-2.00 (m, 7H), 1.58-1.10 (m, 6H).

The invention claimed is:

1. A process for preparing Compound (IX),

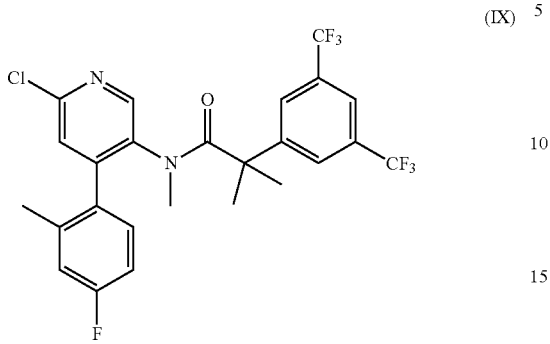
(IX)

said process comprising the following step i) reacting 4-chloro-5-nitropyridin-2 (1H)-one with 4-fluoro-2-methylphenyl boronic acid catalyzed by a palladium complex in the presence of a base to obtain 4-(4-fluoro-2-methylphenyl)-5-nitropyridin-2 (1H)-one (III):

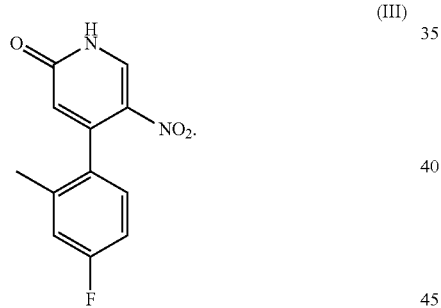
(III)

2. The process according to claim 1, wherein
said palladium complex is palladium acetate, tetrakis(triphenylphosphine) palladium, bis(triphenylphosphine) palladium (II) dichloride, or [1,1'-bis(diphenylphosphino) ferrocene]palladium (II) dichloride, phosphine palladium complex;
said base is potassium carbonate, cesium carbonate, triethylamine, potassium phosphate, sodium t-butoxide, or potassium t-butoxide or a mixture thereof; and
step i) takes place in an organic solvent comprising acyclic and cyclic ethers, toluene, dimethylformamide, N-methyl-2-pyrrolidone, or acetonitrile or mixtures thereof.

3. The process according to claim 1, further comprising:
ii) reacting 4-(4-fluoro-2-methylphenyl)-5-nitropyridin-2 (1H)-one (III) obtained in step i) with POCl₃ to obtain 2-chloro-4-(4-fluoro-2-methylphenyl)-5-nitropyridine (IV):

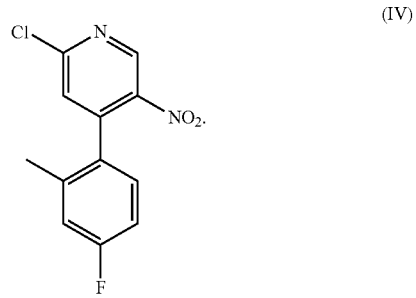 [SMILES: Cc1cc(F)ccc1-c1cc(Cl)ncc1[N+](=O)[O-]]
(IV)

4. The process according to claim 3, further comprising:
iii) reducing the 2-chloro-4-(4-fluoro-2-methylphenyl)-5-nitropyridine by catalytic hydrogenation to obtain 6-chloro-4-(4-fluoro-2-methylphenyl)pyridin-3-amine of formula (V) or a salt thereof:

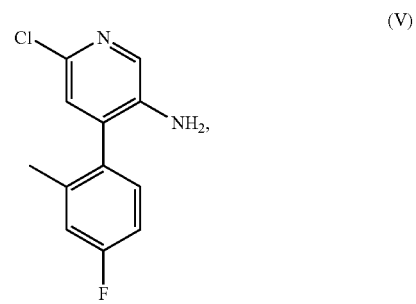 [SMILES: Cc1cc(F)ccc1-c1cc(Cl)ncc1N]
(V)

wherein
said catalytic hydrogenation is carried out in the presence of palladium or platinum on carbon, and
the salt of compound (V) is maleate, hydrochloride, hydrobromide, phosphate, acetate, fumarate, salicylate, sulphate, citrate, lactate, mandelate, tartrate or methanesulphonate.

5. The process according to claim 4, further comprising:
iv) reacting the 6-chloro-4-(4-fluoro-2-methylphenyl)pyridin-3-amine or a salt thereof with 2-(3,5-bis(trifluoromethyl)phenyl)-2-methylpropanoyl chloride in dichloromethane in the presence of an organic base, selected from pyridine, triethylamine, diisopropylamine, N,N-diisopropylethylamine, 2,6-lutidine or a mixture thereof at a temperature at a temperature of 0-5° C. to obtain 2-(3,5-bis(trifluoromethyl)phenyl)-N-(6-chloro-4-(4-fluoro-2-methylphenyl)pyridin-3-yl)-2-methyl-propanamide of formula (VII):

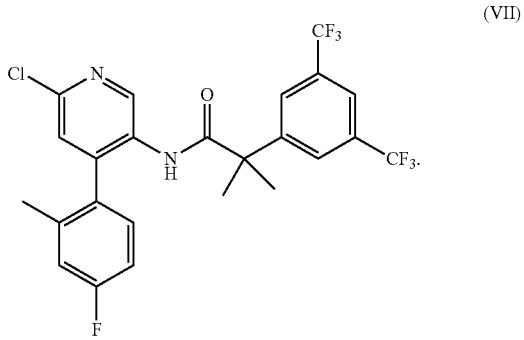 [SMILES: Cc1cc(F)ccc1-c1cc(Cl)ncc1NC(=O)C(C)(C)c1cc(C(F)(F)F)cc(C(F)(F)F)c1]
(VII)

6. The process according to claim 5, further comprising:

v) reacting the 2-(3,5-bis(trifluoromethyl)phenyl)-N-(6-chloro-4-(4-fluoro-2-methylphenyl)pyridin-3-yl)-2-methyl-propanamide with a methyl halide of formula CH₃X (VIII), wherein X is halo, in the presence of cesium carbonate and organic base to obtain Compound (IX), wherein the organic base comprises pyridine, triethylamine, diisopropylamine, N,N-diisopropylethylamine, 2,6-lutidine or in an inorganic base selected from potassium carbonate, cesium carbonate, potassium phosphate, sodium t-butoxide, or potassium t-butoxide or a mixture thereof.

7. The process of claim 1, comprising:

i) reacting 4-chloro-5-nitropyridin-2 (1H)-one (I) with 4-fluoro-2-methylphenyl boronic acid (II) in the presence of a base and a catalyst comprising palladium complex to obtain 4-(4-fluoro-2-methylphenyl)-5-nitropyridin-2 (1H)-one of structure (III):

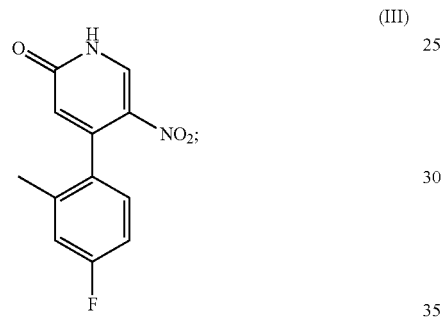

(III)

ii) reacting the 4-(4-fluoro-2-methylphenyl)-5-nitropyridin-2 (1H)-one with POCl₃ to obtain 2-chloro-4-(4-fluoro-2-methylphenyl)-5-nitropyridine (IV):

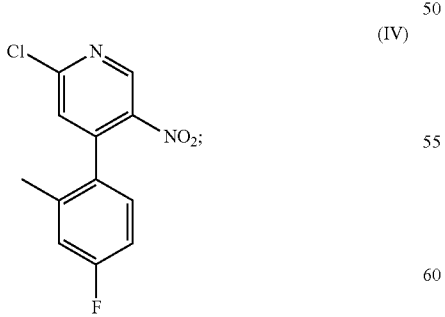

(IV)

iii) reducing the 2-chloro-4-(4-fluoro-2-methylphenyl)-5-nitropyridine by catalytic hydrogenation to obtain 6-chloro-4-(4-fluoro-2-methylphenyl)pyridin-3-amine of formula (V) or a salt thereof:

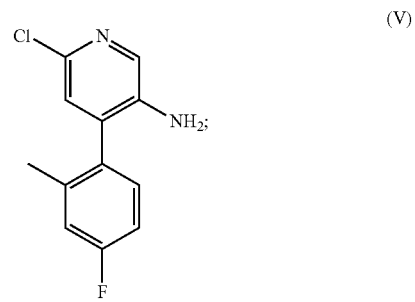

(V)

iv) reacting the 6-chloro-4-(4-fluoro-2-methylphenyl)pyridin-3-amine or a salt thereof with 2-(3,5-bis(trifluoromethyl)phenyl)-2-methylpropanoyl chloride (VI) to obtain 2-(3,5-bis(trifluoromethyl)phenyl)-N-(6-chloro-4-(4-fluoro-2-methylphenyl)pyridin-3-yl)-2-methyl-propanamide of formula (VII):

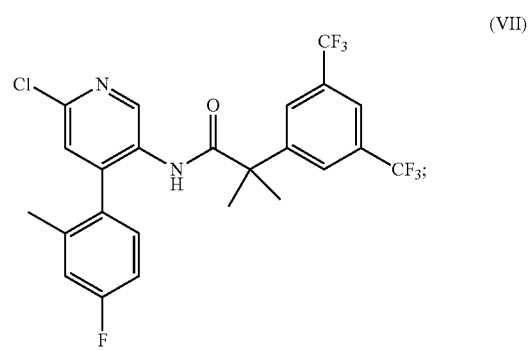 [SMILES: Cc1cc(F)ccc1-c1cc(Cl)ncc1NC(=O)C(C)(C)c1cc(C(F)(F)F)cc(C(F)(F)F)c1]

(VII)

and v) reacting the 2-(3,5-bis(trifluoromethyl)phenyl)-N-(6-chloro-4-(4-fluoro-2-methylphenyl)pyridin-3-yl)-2-methyl-propanamide with a methyl halide of formula CH3X, wherein X is halo, in the presence of cesium carbonate to obtain Compound (IX).

8. A salt of compound (V):

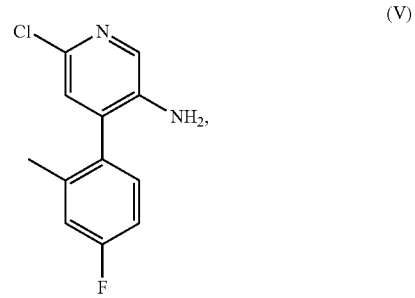 [SMILES: Cc1cc(F)ccc1-c1cc(Cl)ncc1N]

(V)

wherein the salt is maleate, hydrochloride, hydrobromide, phosphate, acetate, fumarate, salicylate, sulphate, citrate, lactate, mandelate, tartrate or methanesulphonate.

9. A compound of formula (VII):
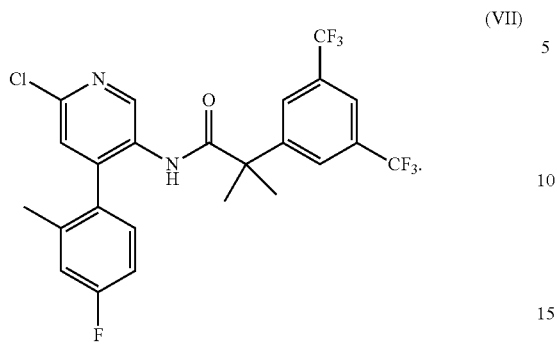
10. The process according to claim 3, wherein the salt of compound (V) is hydrochloride.
* * * * *